United States Patent
Ribeiro et al.

(10) Patent No.: US 7,248,027 B2
(45) Date of Patent: Jul. 24, 2007

(54) POWER CONVERTERS IN WHICH THE INPUT POWER COUPLING TIMES ARE ADJUSTED IN CONJUNCTION WITH CYCLE SKIP COUNTS

(75) Inventors: Milton D. Ribeiro, Los Altos, CA (US); Kent Kernahan, Cupertino, CA (US)

(73) Assignee: FyresStorm, Inc., Sunnyvale, CA (US)

( * ) Notice: Subject to any disclaimer, the term of this patent is extended or adjusted under 35 U.S.C. 154(b) by 437 days.

(21) Appl. No.: 11/030,729

(22) Filed: Jan. 5, 2005

(65) Prior Publication Data
US 2006/0149499 A1 Jul. 6, 2006

(51) Int. Cl.
*G05F 1/40* (2006.01)
*G05F 1/50* (2006.01)
*H02H 7/10* (2006.01)

(52) U.S. Cl. ...................... 323/282; 323/268
(58) Field of Classification Search ................ 323/222, 323/223, 226, 265, 268, 271, 273, 282, 283; 363/50, 55, 56.01, 56.02, 56.03, 56.05
See application file for complete search history.

(56) References Cited

U.S. PATENT DOCUMENTS 5,694,029 A * 12/1997 Hayes et al. ................ 323/282
6,121,760 A * 9/2000 Marshall et al. ............ 323/282
6,621,256 B2 * 9/2003 Muratov et al. ............ 323/282
6,734,655 B1 * 5/2004 Javanifard et al. .......... 323/222
6,825,644 B2 11/2004 Kernahan et al.
2004/0095119 A1 5/2004 Kernahan et al.

OTHER PUBLICATIONS

U.S. Appl. No. 11/030,585, filed Jan. 5, 2005; entitled, "Power Converters With Limited Operation to Conserve Power and With Adjustments that Overcome Ringing;".
"DC-DC Converter Tutorial," Dallas Semiconductor Maxim; http://www.maxim-ic.com/appnotes.cfm/appnote_number/710; pp. 1-8, Oct. 19, 2000.

* cited by examiner

*Primary Examiner*—Matthew V. Nguyen
(74) *Attorney, Agent, or Firm*—Michael Shenker; Michael W. Caldwell

(57) ABSTRACT

In a power converter, an input power source (98) is intermittently coupled to provide a current flow (Icoil) in consecutive cycles (T) to generate an output voltage (Vo). The coupling durations (Tp) are adjusted in conjunction with a cycle skip count (112CNT) which is the count of cycles in which no coupling occurs. In some embodiments, the adjustments are performed to keep the coupling durations near the maximum efficiency range (between TLOW and THIGH), and the skip count is adjusted at the same time to obtain the desired output voltage in the presence of load current variations. The coupling frequencies are kept in a desired range to avoid interference with other circuit elements.

60 Claims, 16 Drawing Sheets

| Duty Cycle Event | 0 | 1 | 2 | 3 | 4 | 5 | 6 | 7 | 8 |
|---|---|---|---|---|---|---|---|---|---|
| Start Quanta | 2 | 0 | -2 | -2 | -2 | -2 | -2 | -2 | -2 |
| Velocity | -2 | -2 | 0 | 0 | 0 | 0 | 0 | 0 | 0 |
| Next Quanta | 0 | -2 | -2 | -2 | -2 | -2 | -2 | -2 | -2 |
| Correction | 0 | 2 | 0 | 0 | 0 | 0 | 0 | 0 | 0 |
| Next velocity | -2 | 0 | 0 | 0 | 0 | 0 | 0 | 0 | 0 |

| Duty Cycle Event | 0 | 1 | 2 | 3 | 4 | 5 | 6 | 7 | 8 |
|---|---|---|---|---|---|---|---|---|---|
| Start Quanta | 3 | 1 | -1 | -2 | -1 | 0 | 1 | 1 | 1 |
| Velocity | -2 | -2 | -1 | 1 | 1 | 1 | 0 | 0 | 0 |
| Next Quanta | 1 | -1 | -2 | -1 | 0 | 1 | 1 | 1 | 1 |
| Correction | 0 | 1 | 2 | 0 | 0 | -1 | 0 | 0 | 0 |
| Next velocity | -2 | -1 | 1 | 1 | 1 | 0 | 0 | 0 | 0 |

POWER CONVERTERS IN WHICH THE INPUT POWER COUPLING TIMES ARE ADJUSTED IN CONJUNCTION WITH CYCLE SKIP COUNTS

CROSS REFERENCE TO RELATED APPLICATIONS

This application is related to U.S. patent application Ser. No. 10/296,000 filed on Nov. 14, 2002 by Kent Kernahan and John Carl Thomas, David F. Fraser, and Jack Roan, entitled "Switching Power Converter", now U.S. Pat No. 6,909,266 which is incorporated by reference herein in its entirety. This application is also related to U.S. patent application Ser. No. 11/030,585, attorney docket number M-15402 US, entitled POWER CONVERTERS WITH LIMITED OPERATION TO CONSERVE POWER AND WITH ADJUSTMENTS THAT OVERCOME RINGING, filed by Kent Kernahan and Milton Ribeiro on the same date as the present application and incorporated herein by reference.

FIELD OF THE INVENTION

This invention relates to switching power supplies or converters. In some embodiments, this invention improves the efficiency of a switching power converter drive circuit.

BACKGROUND OF THE INVENTION

Power supplies are often required to provide voltage or current regulation throughout a wide range of load values. The components used in the drive circuit are selected to provide maximum efficiency at the load value that is expected to be typical operation. Operation at load values that are very different from the design target causes the drive circuit efficiency to be less than optimal.

SUMMARY

This section summarizes some features of the invention. Other features are described in subsequent sections. The invention is defined by the appended claims.

In a power converter, an input source of power is intermittently coupled to provide a current flow in consecutive cycles to generate the output voltage. The converter efficiency (measured as a charge obtained at the output terminal per unit of charge provided by the input power source) is a function of the time durations in which the input power source is coupled to provide the current flow. These time durations control the output voltage, which must stay within a desired range. According to some embodiments of the present invention, these time durations are adjusted in conjunction with a cycle skip count, i.e. the count of cycles in which the input power source is not coupled to provide the current flow. If the calculated time durations are too small from the efficiency standpoint (which may happen if the load current becomes small and the calculated time durations are made small to keep the output voltage in the desired range), then the time durations are increased, but the skip count is also increased to keep the output voltage in the desired range. If the calculated time durations are too large (which may happen if the load current increases), the time durations are reduced and so is the skip count.

In particular, some embodiments of the present invention adjust the scheduling of activations of the drive circuit (the circuit that couples the input power source to the output voltage) such that the drive circuit is used efficiently across a wide range of load values. Some embodiments also provide for control of the frequency of electronic noise such that interference with other circuit elements may be avoided. Other goals are also achieved as will become clear from the description below.

In some embodiments, the drive circuit is controlled to operate in proximity to its most efficient design point across a very broad range of loads.

A narrow range of pulse widths, which is obtained in some embodiments due to the input power source coupling durations being near the greatest efficiency value, allows the circuit designer to select components with an ideal combination of switching characteristics, capacitance, and on-resistance (RDS_on). The result is a power converter with good efficiency across a wide dynamic range of output power.

Other features of the invention are described below. The invention is defined by the appended claims.

DETAILED DESCRIPTION OF SOME EMBODIMENTS

| Definitions, Acronyms, and Abbreviations | |
|---|---|
| CCM | Continuous Current Mode |
| Coss | FET output capacitance |
| Cycle skipping | Procedure wherein no pulse is applied for one or more time periods |
| DCM | Discontinuous Current Mode |
| DPC | Digital Pulse Controller as described in aforementioned U.S. patent application No. 10/296,000 and in U.S. Pat. No. 6,825,644 |
| dX | Change in value of X, where X may be any parameter such as I, V, Tp, Ts, etc. |
| Icoil | Coil current |
| L | Inductance value (h) |
| pX | Value of X for the event following the instant event (e.g. pTp = Tp for T(n + 1)) |
| 1X | Value of X for the event preceding the instant event (e.g. 1Tp = Tp for T(n − 1)) |
| REG | Regulation system, which includes REG_Eng, REG_Sch, SC, SV, Variables and interfaces to DPC, DAS, NFETDVR and SYS, as described in aforementioned U.S. patent application No. 10/296,000 and U.S. Pat. No. 6,825,644 |
| SYS | Microcontroller-based system control as described in aforementioned U.S. patent application No. 10/296,000 and U.S. Pat. No. 6,825,644 |
| T | One time period |
| THIGH | Maximum FET on time allowed by the designer |
| TLOW | Minimum FET on time allowed by the designer |
| Tp, $t_p$ | Time period during which a control FET is turned on. |
| Ts, $t_s$ | Time period during which a synchronizing FET is turned on, or during which a "low side" diode conducts. |
| Vdbh | High dead band limit. |
| Vdbl | Low dead band limit. |
| Vdb | Dead band width; equals (Vbbh − Vbdl) |
| Vo | Output voltage; voltage across the load. |
| VSPL | Very Simple Proportional Loop. |
| Vtar | Target voltage. |

Figure 1:
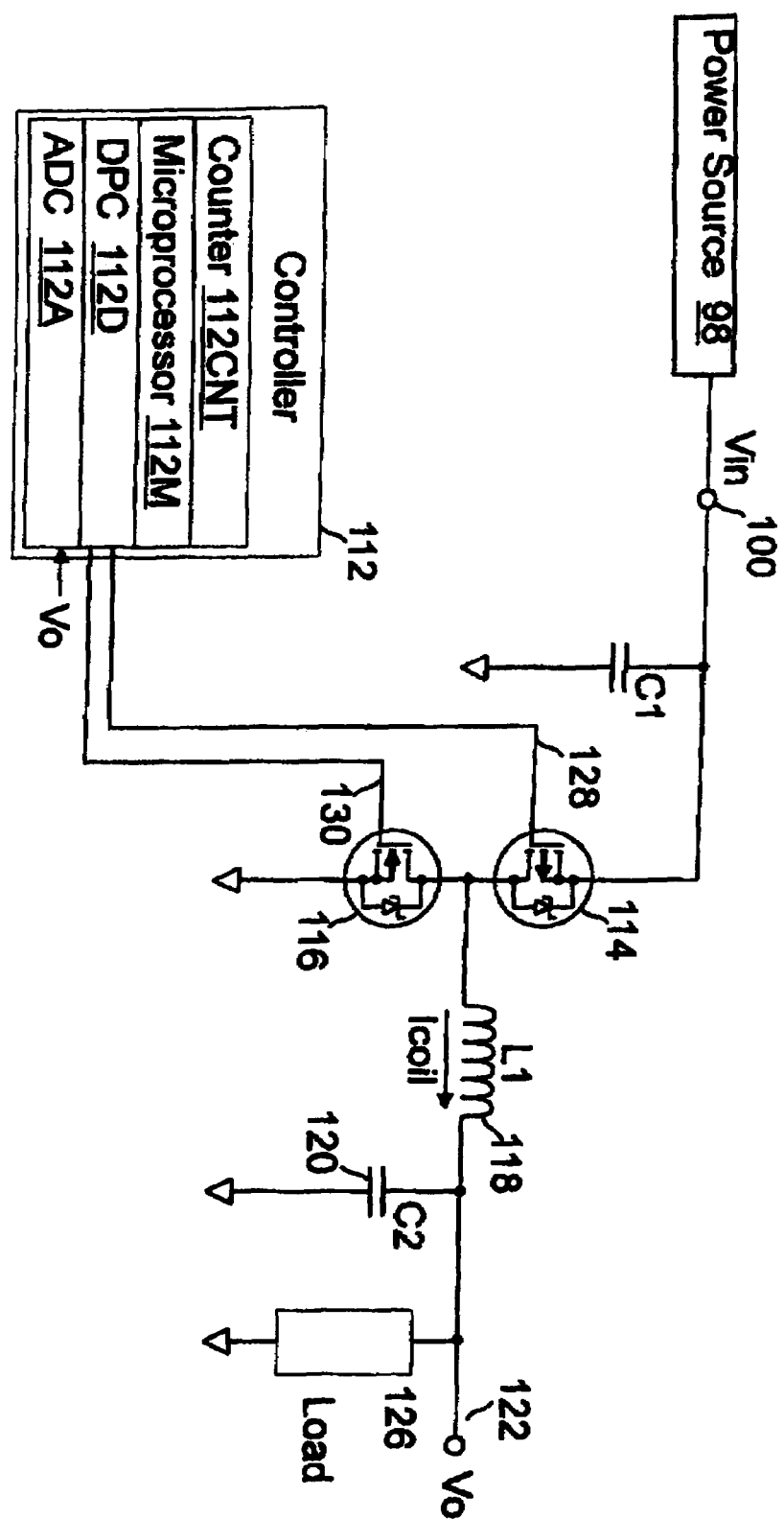
FIG. 1 is a circuit diagram of a buck power converter according to some embodiments of the present invention.

Referring to FIG. 1, the basic operation of a buck switching power converter is the intermittent connection between an input voltage "Vin" provided by some power source 98 at input terminal 100, and a coil 118 by a control FET 114 for a time termed "Tp" (FIGS. 2-4), after which the FET 114 is turned off and a synchronizing FET 116 is turned on for a time termed "Ts". This is accomplished by a controller 112 generating appropriate signals in accordance with the Tp and Ts parameters on lines 128 and 130 connected to the gates of FETs 114 and 116. This causes current "Icoil" to flow through coil 118 to load 126. Output voltage "Vo", measured at output terminal 122, is smoothed by a capacitor C2. FET 116 may be replaced by a diode to form a non-synchronous buck supply, in which case line 130 is not needed. In a non-synchronous topology Ts is the time during which the current from coil 118 continues to flow after FET 114 is turned off. Said differently, it is the time required for the current to return to zero (FIGS. 3, 4) or some minimum value (FIG. 2) after time Tp is completed. Those skilled in the art will recognize that some embodiments of the present invention may be applied to any switching power converter topology, including but not limited to buck, boost, and buck/boost wherein any of them may be implemented as synchronous or non-synchronous designs. Tp and Ts are calculated during one time period Tn 200 and applied during the next time period Tn+1 202, as exemplified in FIG. 2, FIG. 3, and FIG. 4. We will sometimes write T(n) for Tn, T(n+1) for Tn+1, etc.

In controller 112, analog to digital converter 112A samples and digitizes the voltage Vo in consecutive voltage sampling operations and provides the digital voltage to a microprocessor (or microprocessors) 112M. Microprocessor 112M computes the times Tp and Ts and generates the corresponding signals on lines 128, 130 in each time period Tn. Some embodiments use circuitry described in the aforementioned U.S. patent application Ser. No. 10/296,000 or U.S. Pat. No. 6,825,644 issued to Kernahan et al. on Nov. 30, 2004 (both incorporated herein by reference), but with microprocessor 112M programmed with software to implement the present invention. In such embodiments, ADC 112A and DPC (digital pulse controller) 112D correspond, respectively, to ADC 1206 and DPC 1201 shown in FIGS. 12A-12D of the application Ser. No. 10/296,000. Microprocessor 112M of FIG. 1 of the present application controls DPC 112D to generate signals for the lines 128, 130. In patent application Ser. No. 10/296,000, the calculation of times Tp, Ts is performed in REG 1204 in cooperation with central processing module (SYS) 1205. These functions are incorporated into the actions which are ascribed to the controller 112 of FIG. 1 of the present invention. The REG and SYS modules of application Ser. No. 10/296,000 can be part of processor block 112M of the instant application. As described in application Ser. No. 10/296,000, the DPC outputs can be connected to the FETs 114, 116 through a driver, not shown in FIG. 1 of the instant application. The present invention is not limited to the circuitry of application Ser. No. 10/296,000 or U.S. Pat. No. 6,825,644, or to software programmable implementations.

Figure 2:
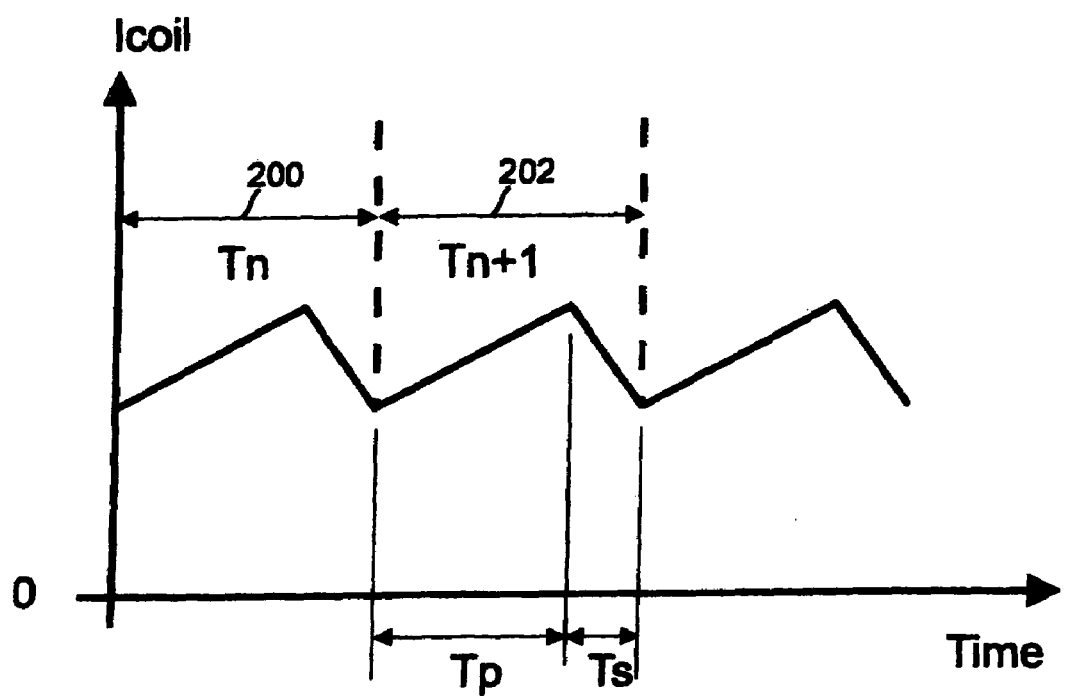
FIG. 2 is a graph of a converter's induction coil current in a continuous coil current operation.
Figure 3:
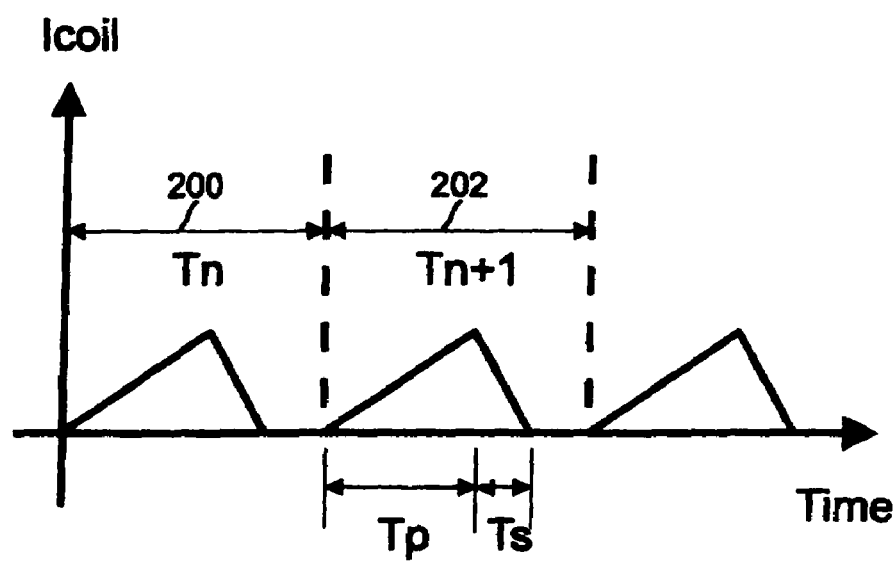
FIG. 3 is a graph of a converter's induction coil current in a discontinuous coil current operation.

Buck operation may be viewed as having two modes: continuous coil current operation and discontinuous coil current operation relative to the current of coil 118. As shown in FIG. 2, continuous coil current mode ("CCM") is defined as that condition wherein there is always current being delivered by coil 118, though not necessarily at a steady state value. In discontinuous coil current mode ("DCM"), illustrated in FIG. 3, the current from coil 118 returns to zero during each duty cycle event (i.e. each time period Tn, Tn+1, etc. in which Tp>0). The condition wherein the coil 118 current returns to zero just as another duty cycle event starts defines the maximum current that can be delivered in DCM, and is termed the "critical conduction state", shown in FIG. 4. A variation of DCM occurs when the load demand is very small such that the pulse required for the control FET 114 is so narrow that it would be inefficient to operate the controller 112 and turn the FETs 114, 116 on and off. In this case a certain number of cycles Tn are skipped altogether, i.e: transistor 114 remains off during the Tn cycles, but the pulse width Tp in the duty cycle events is increased. This operation is termed "cycle skipping mode." In some embodiments, the present invention is suitable for DCM control, with or without cycle skipping, and also for CCM.

Figure 10:
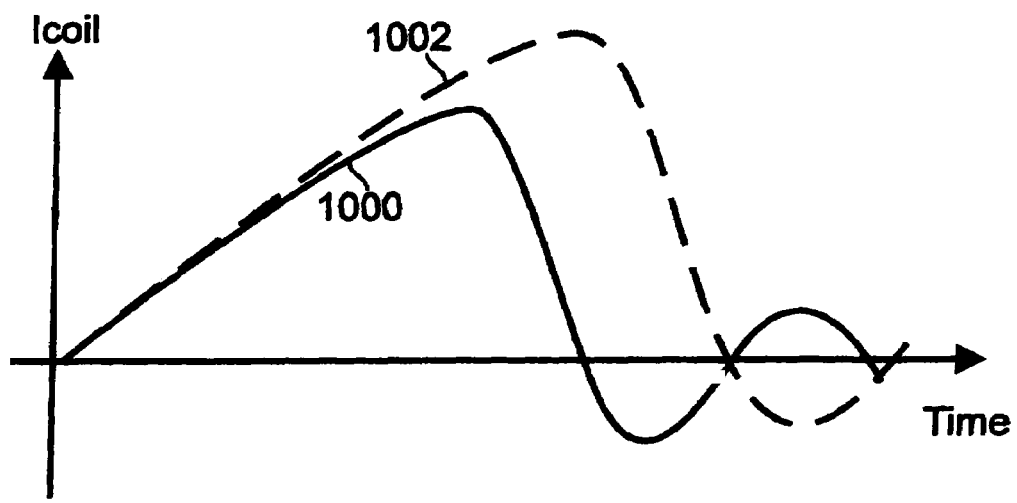
FIG. 10 is a graph of a converter's induction coil current with ringing.

In DCM operation the current through coil 118 always returns to zero within one time period T (where T is the general notation for the cycles Tn, Tn+1, etc., also denoting the length of each cycle; these cycles are of equal length in some embodiments). Thus, coil 118 does not integrate any current from the prior duty cycle event. There is no history to comprehend. Since the charge delivered to the coil may be accurately calculated, the average current may be known as well. However, the challenge of DCM is ringing that occurs as the current returns to zero. In FIG. 10, the ringing is shown at 1004 where the coil current Icoil is negative at the end of the Ts period. The ringing is caused by the output capacitances ("Coss") of FET 114 and FET 116 against the inductance of coil 118. The ringing magnitude can be significant, and can cause a non-monotonic response. In other words, if the controller 112 increases the duty cycle Tp/T in some cycle Tn, the total charge flowing into coil 118 in the next cycle T(n+1) could decrease, or vice versa. This is the result of the ringing being asynchronous to the Icoil cycle frequency. Thus, we never know ahead of time exactly where in the phase of a ring the next duty cycle will begin. For example, consider a condition where we increase the duty cycle Tp/T. We would expect the current in the following cycle period T to increase. But if the incremental change in energy (or charge) of the pulse is less than that of the energy of the ringing, and if the rising edge of the next cycle begins during the worst case timing of Icoil ringing (i.e. at the bottom of area 1004), the change in current in the next cycle may actually be in the wrong direction. Thus, Vo could decrease instead of increasing. Further, an oscillation condition could occur if controller 112 keeps increasing the duty cycle in response to falling Vo and the increased duty cycle eventually drives Vo to a value larger than expected. The resolution of this issue is to always use an error correction (i.e. an incremental charge) with a step size larger than the maximum opposite pulse 1004 of the ringing. This will insure a correction is always in the desired direction, although perhaps in excess of what is needed.

Figure 4:
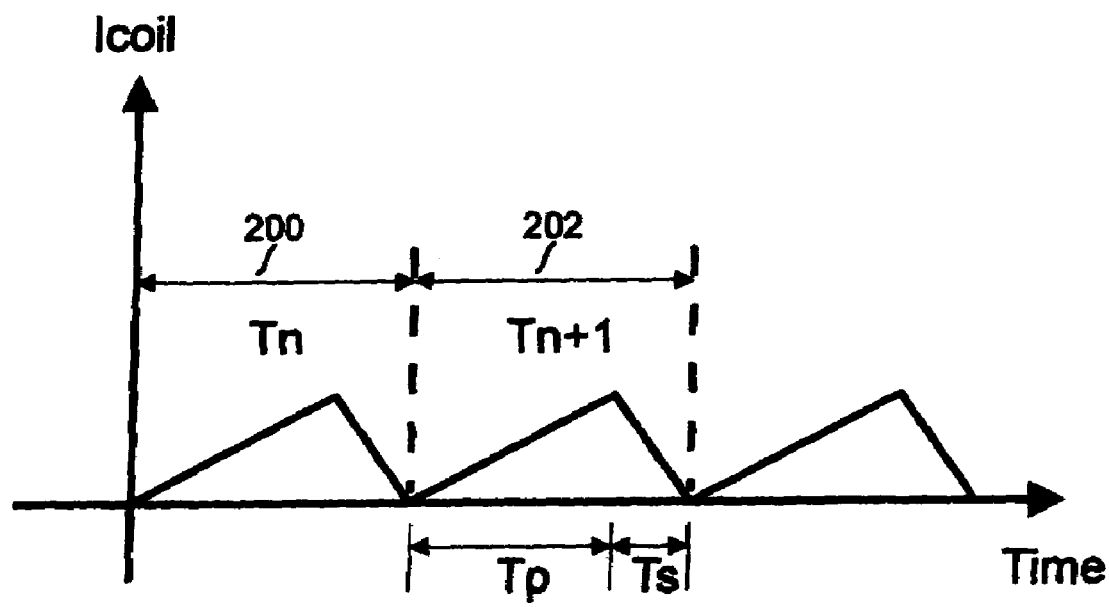
FIG. 4 is a graph of a converter's induction coil current in a critical conduction state.

For a given switching power supply design the highest power condition is in CCM. For the lowest power demands, pulse frequency mode ("PFM") may be used. For power demands between CCM and PFM, a DCM method according to some embodiments of the present invention may be used. In some embodiments, a DCM control loop uses the VSPL method, described below, exclusively. A hybrid condition exists when the duty cycle under DCM reaches the critical conduction point (FIG. 4). If the duty cycle increases beyond the critical conduction point the system is in CCM by definition, but power may be saved by continuing to utilize VSPL with a very low gain (i.e. a very low incremental value dTp for the Tp parameter, and thus a very low incremental charge). In some embodiments, once VSPL is initiated we continue to use it so long as the output Vo can be maintained within the desired range (see e.g. FIG. 5 described below), transitioning to a more appropriate control technique for CCM when it cannot.

Figure 5:
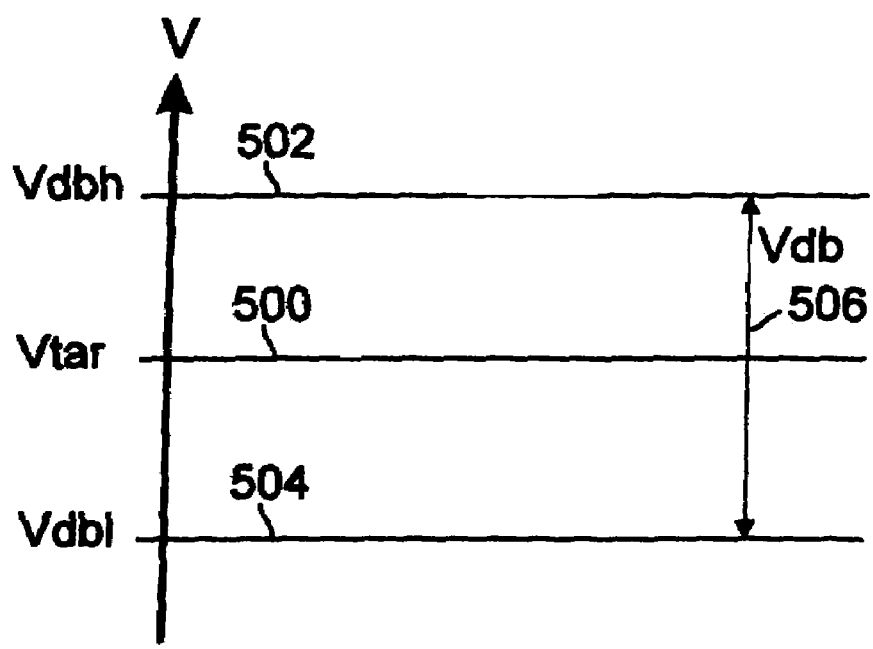
FIG. 5 illustrates output voltages in some embodiments of the present invention.

FIG. 5 defines various voltage conditions for Vo. The target output voltage is "Vtar" 500. The high dead band limit is "Vdbh" 502. The low dead band limit is "Vdbl" 504. The total dead band range is "Vdb" 506, which equals (Vdbh− Vdbl). In one embodiment, Vtar=2.5 V, and Vdbh and Vdbl differ from Vtar by 2%, i.e. 50 mV. In some embodiments, the same controller 112 controls a number of different Vo voltages in the system, which range from 1.5V to 12.5V, with the same T value of 2 psec. These values are exemplary and not limiting. Other embodiments involve other voltage and timing values. In one embodiment VSPL is not utilized until Vo is within Vdb 506 and the system is in DCM. The designer may wish to impose other requirements for starting VSPL, such as being in equilibrium for a certain period of time (the equilibrium condition means that the Icoil current equals the load current, and hence Vo remains unchanged), remaining within Vdb for a certain period of time, being below a certain dVo/dt, or the like. For purposes of this description we assume here that we are already within the dead band Vdb, as defined by the designer, and have decided to use VSPL.

There are four design strategies that can be employed by the VSPL method:

1. In one embodiment, accept any Vo value that is stable within the dead band (and hence make no changes to Tp and Ts). That is, output Vo does not have to be exactly equal to Vtar. In another embodiment, stability off-target (Vtar) but within the dead band, is not allowed to persist beyond a certain time limit.
2. If output Vo is moving in the correct direction, make no change to Tp and Ts.
3. The corrections to Tp and Ts depend on Vo and perhaps on whether or not the measured Vo value is greater than, equal to, or less than the previously measured Vo value, but the correction does not otherwise depend on the Vo rate of change (dVo/dt).
4. Adequately deal with ringing to insure monotonicity.

Figure 6A:
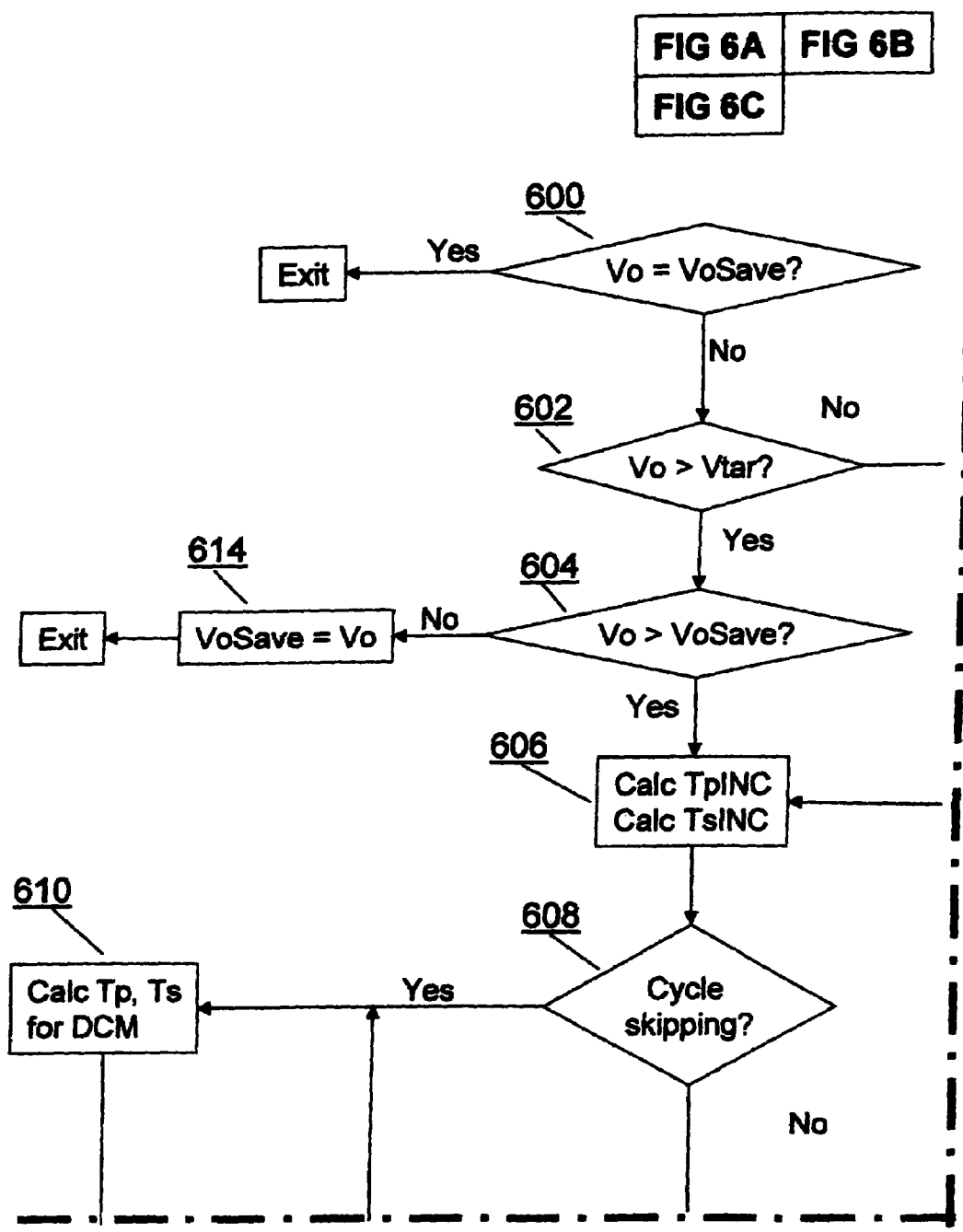
FIG. 6 is a flow chart of a method for controlling the converter output voltage according to some embodiments of the present invention.
Figure 6B:
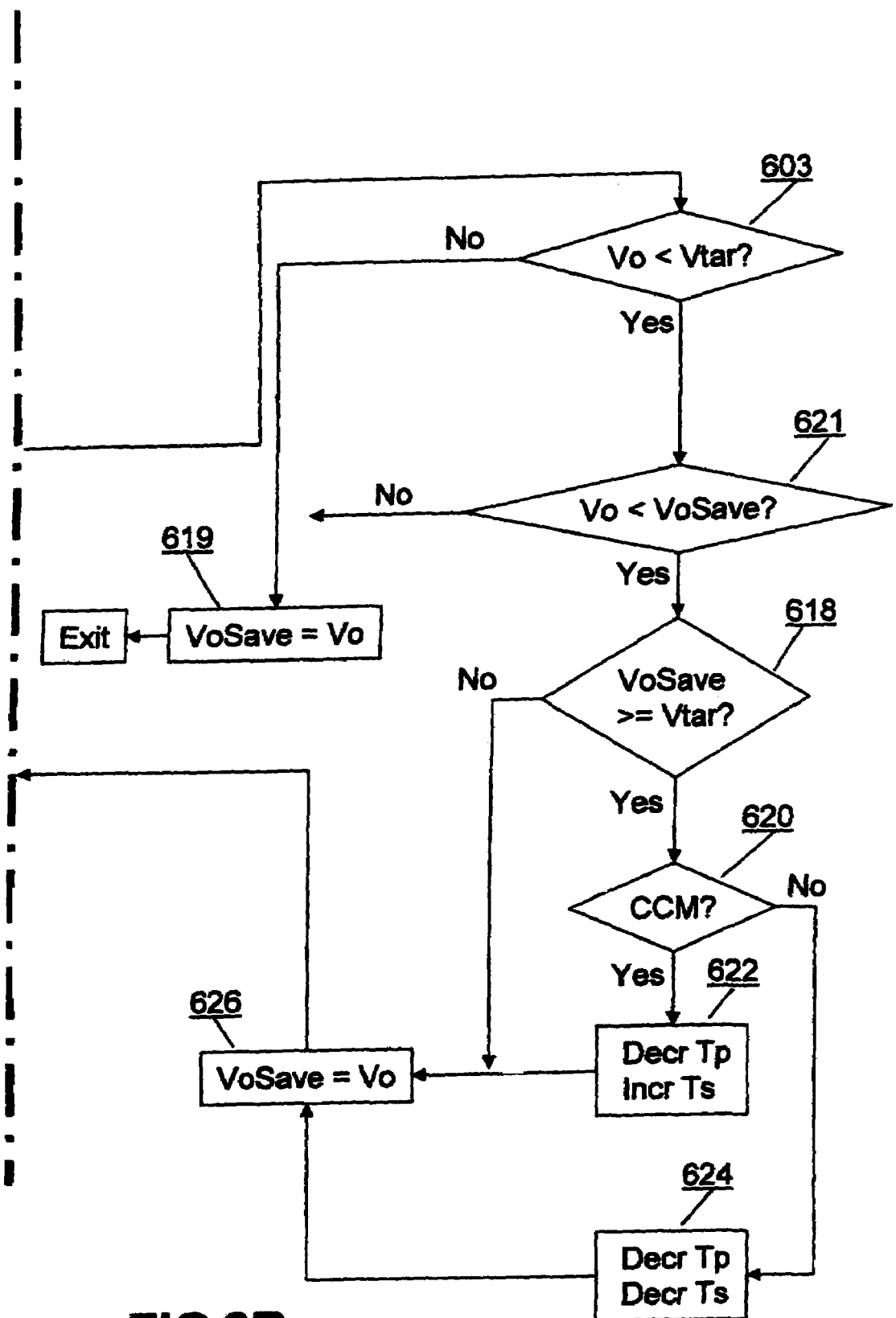
Figure 6C:
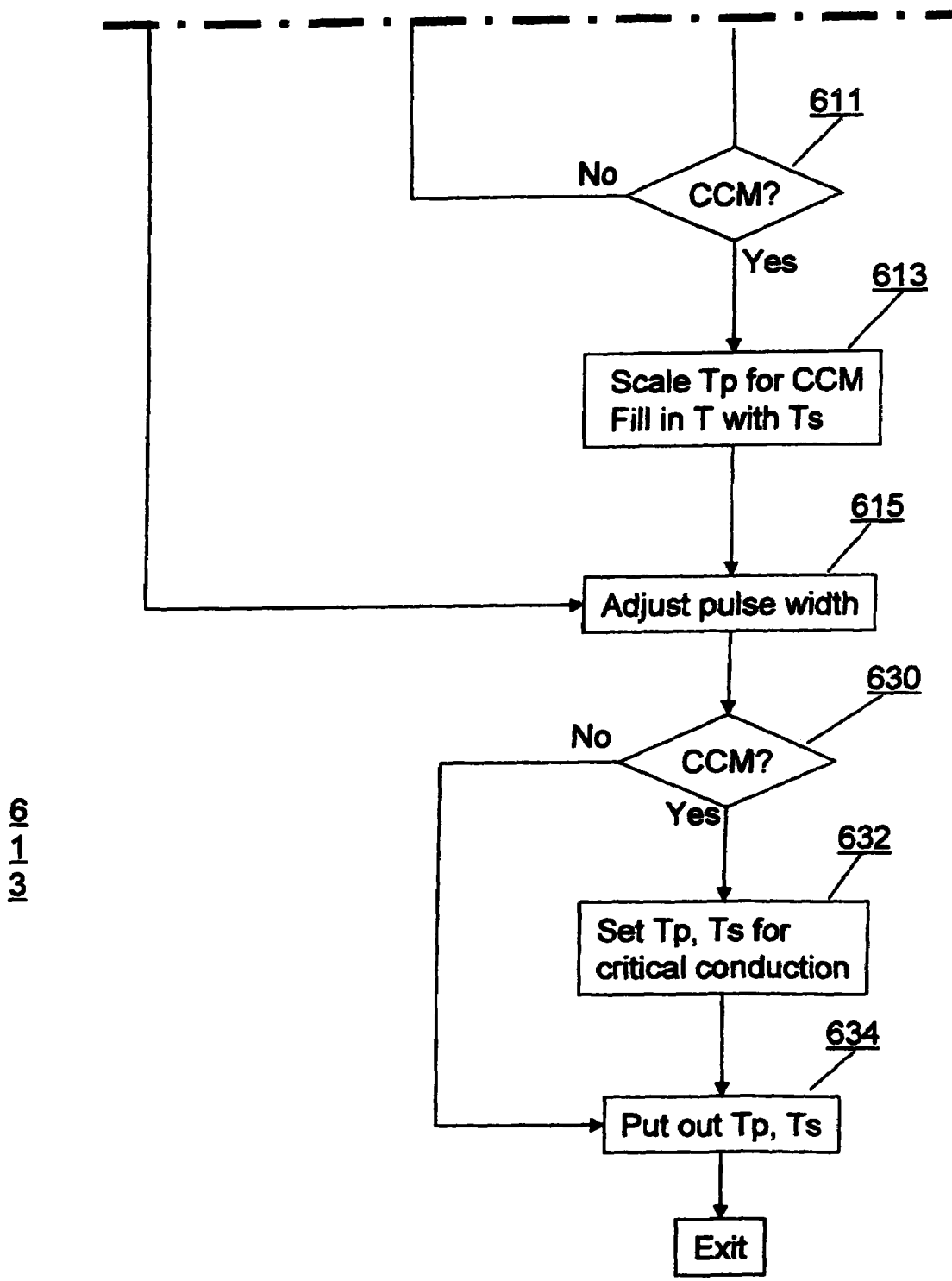

The above strategies are embodied in the flow chart of FIG. 6. This flow chart illustrates operations performed by microprocessor 112M during a duty cycle period T(n) to calculate Tp and Ts for the next duty cycle period, which is the period T(n+1) if there is no cycle skipping, or some later period if the cycle skipping is in effect. The values T, Tp, Ts, Vo, and other values manipulated by the controller as described below are stored in the controller's memory (not shown) in digital form. At step 600 we check to see if Vo is equal to a previously stored value of Vo, termed "VoSave." (VoSave can be stored in a memory, not shown, of controller 112.) If Vo=VoSave, we exit (leaving Tp and Ts unchanged). If Vo does not equal VoSave we check at step 602 to determine if Vo is above Vtar. If Vo is above Vtar we go to step 604 and compare Vo to VoSave. This will indicate if Vo is moving towards or away from Vtar. If Vo is moving towards Vtar (Vo<VoSave at step 604) no action is taken except to update the current value of Vo into VoSave (step 614), and exit the loop. If Vo is moving away from Vtar (Vo>Vtar at step 604) then we move to step 606 to determine the needed adjustments dTp, dTs for Tp and Ts respectfully. These adjustments can be determined in different ways, and one embodiment will be discussed in connection with equation [EQ 7] below. For that embodiment, dTp and dTs are calculated as multiples of TpINC and TsINC respectively, and the values TpINC and TsINC may be calculated at step 606 and the values dTp and dTs may be determined later. If at step 602 we found Vo to not be above Vtar we check at step 603 to see if Vo is below Vtar. If not we know from step 602 that Vo must equal Vtar, so no change to Tp and Ts is needed. We update VoSave at step 619 and exit. If Vo is less than Vtar at step 603 we go to step 621 and test for Vo less than VoSave. If not, then Vo is moving in the correct direction and no adjustment is needed, so again update VoSave at step 619 and exit. If, however, Vo is below VoSave, then Tp will need to be increased. Before increasing Tp, we look to see if Tp needs to be pre-processed to avoid a limit cycle issue. First, if VoSave is less than Vtar (step 618) we are not near Vtar, so pre-processing is not needed; save Vo to VoSave at step 626 and move to step 606. If at step 618 VoSave is greater than or equal to Vtar, and we know that the instant Vo is below Vtar, then we are very close to Vtar. We will decrease the gain of Tp by one unit by subtracting one unit from Tp at step 622 or 624 (one unit corresponds to the minimal time resolution TimeRes=T/ TimeSteps, where TimeSteps is the number of digital units in the time period T). This asymmetry in gain (compared to the gain for Vo above Vtar) eliminates a limit cycle issue and also encourages the system to find the equilibrium condition. The pre-processing is different for CCM and DCM. If in CCM (step 620) we decrease Tp and increase Ts by one unit (step 622). The same pre-processing is performed if we are near CCM. The "near CCM" condition can be defined, for example, as a condition that Tp+Ts is within some fixed value of the total period T. See e.g. equation [EQ 5] described below. If not in or near CCM, we decrease both Tp and Ts by one unit (step 624). In either case we save Vo to VoSave (step 626), and are now ready to find the Tp and Ts correction TpINC, TsINC for both the case when Vo is above Vtar and the case when Vo is below Vtar.

At step 606 we calculate the adjustment values TpINC, TsINC for Tp and Ts, proportional to the size of the error (i.e. to Vo−Vtar). See e.g. equation [EQ 4] below. At step 608 we check to see if cycle skipping is in effect. If not, at step 611 we check to see if we are in or near CCM. This computation can be done using equation [EQ 5] with the Tp and Ts values possibly modified at steps 622, 624. If we are not in or near CCM, we are in DCM, therefore move to step 610. If in CCM we determine the new Tp value Tp=Tp+dTp at step 613. An exemplary calculation, using the TpINC value of step 604, is described below in connection with equations [EQ 6]. We also calculate the new Ts by filling in the time period T (Ts=T−Tp, see equations [EQ 6]). This completes the calculation of the next Tp and Ts for the CCM condition, for Vo values above and below Vtar. If at step 608 we determined that cycle skipping is in effect, or at step 611 we determined we are not in or near CCM, therefore in DCM, we move to step 610 to calculate the Tp and Ts for DCM (according to the equations [EQ 7] described below). In some embodiments, whether in CCM or DCM (from step 613 or 610), we go to step 615 to further adjust the Tp and Ts values for better efficiency (as described below in connection with FIGS. 16-17). Before putting out the Ts and Tp signals we check at step 630 for CCM as determined by the new Tp and Ts values (i.e. Tp+Ts>T). If in CCM, we set Tp and Ts for the critical conduction condition at step 632. Tp is set as in equation [EQ 1] below, and Ts is set to T−Tp. Finally we move to step 634 and pass the Tp and Ts values to the REG module in processor 112M for use at the next duty cycle event. Appendix 1 is an example of C language source code implementing one embodiment.

In some embodiments the test at step 603 is not used, meaning that the case Vo=Vtar is treated like Vo<Vtar. In some other embodiments Vo is only stored into VoSave when an adjustment to Tp has been made (at step 606), eliminating the steps 614 and 619. Appendix 2 is an example of C language source code implementing one such embodiment.

In one embodiment Vo is monitored to insure operation within the dead band. In DCM, a correction is only made in a cycle that has a duty cycle event, thus as the skip count gets greater the effective gain of VSPL becomes less (the effective gain is dTp/T1 where T1 is the time between the starting points of two consecutive duty cycle events, i.e. T1 includes a duty cycle event and the following skip cycles). VSPL does not know about time, only about a duty cycle event. In CCM, if VSPL is used it does not have an exact value of current, but attempts to constantly steer Vo back to Vtar using very low gain.

Once entered, VSPL is capable of taking the system into CCM. In that case the VSPL algorithm continues to run, but the current of coil 118 never returns to zero. One may elect to continue to use VSPL so long as Vo stays within Vdb, though one may also use a different control method during CCM.

To determine the VSPL initial Tp, Ts and VoSave values, first find Tp for the critical conduction point:

$$T_P = \frac{V_{TAR} * T}{V_{IN}} \quad [EQ\ 1]$$

(Our variable names are not case sensitive: Vtar=$V_{TAR}$, $V_{IN}$=Vin, $T_P$=Tp, and so on.)

Scale Tp by approximately 85%:

$$T_P = T_P * \left(\frac{1 + 1/\sqrt{2}}{2}\right)$$

Now calculate Ts using $$T_S = \frac{T_P * (V_{IN} - V_{TAR})}{V_{TAR}}.$$

The initial cycle skip count is zero, so we initialize CS=1 where CS is a memory location storing a value one greater than the skip count.

To finalize the VSPL initial conditions, we determine the minimal dTp and dTs increments as $$T_P VSPLGain = VSPLGain$$

and $$T_S VSPLGain = \frac{T_P VSPLGain * T_S}{T_P}$$

The dTp and dTs values will be multiples of TpVSPLGain and TsVSPLGain respectively, i.e. dTp=TpINC*TpVSPLGain and dTs=TpINC*TpVSPLGain (calculated at step 610). TpVSPLGain=VSPLGain is determined as described below.

Now we initialize $V_O$Save=$V_{TAR}$.

TpVSPLGain is determined by the designer to insure the problem of coil current ringing in DCM is overcome. In determining TpVSPLGain there are two issues to be considered: (a) the minimum adjustment step size to insure the monotonicity in view of possible ringing, and (b) the maximum gain above which the system may be unstable.

In other embodiments, a fixed gain dTp is used. This is effective because Vo is assumed to be in proximity of Vtar when the VSPL method is employed.

Ringing is illustrated in FIG. 10. The coil current of a pulse 1000 is seen to ring. The energy (measured as the charge) of the ringing is represented by the area 1004. The area beneath the axis Icoil=0 represents energy removed from load 126 (FIG. 1), that is, subtracted from the energy provided by the pulse 1000. Pulse 1002 represents the current pulse of the next duty cycle, shown here superimposed upon the pulse 1000. The difference between the two curves is due to the adjustment calculated at step 610; in this example the Tp adjustment is positive. The energy difference between pulse 1002 and pulse 1000 is the area 1006. Note that neither the phase of the ringing nor its magnitude at any point in time is known to controller 112. Thus the start of the adjusted pulse 1002 is asynchronous to the ringing. If an adjustment were made such that the area 1006 would be less than the area 1004, and if the adjusted pulse 1002 were to begin at the time shown as point 1008, the resulting change in energy in pulse 1002 (hence, in voltage Vo) would be negative (change in charge equals the area 1006 minus the area 1004), though the controller system anticipated an increase. In some embodiments, the designer sets TpVSPL-Gain to a value that will insure that the minimum adjustment dTp is guaranteed to result in a change in the desired direction. This insures the Vo responses will always be monotonic for any given adjustment.

Figure 13:
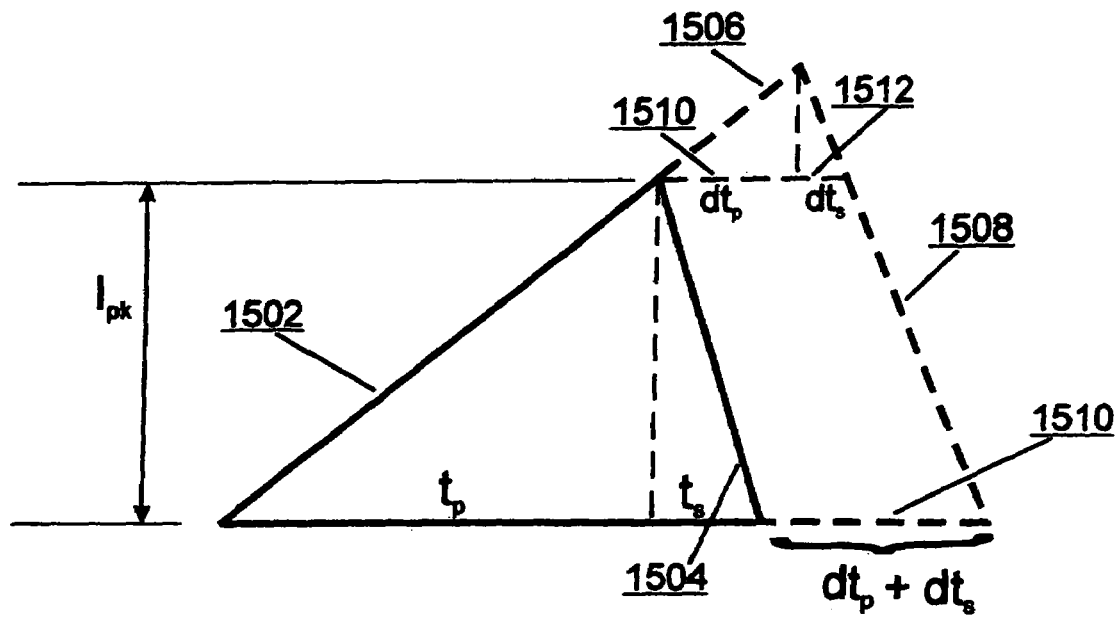
FIGS. 13, 14 are graphs of coil current pulses.

FIG. 13 is an idealized representation of a duty cycle event. Numerals 1502 and 1504 represent the current through the coil in an instant duty cycle, wherein the power and sync times are Tp and Ts, respectively. Numerals 1506 and 1508 represent the current after the application of adjustments dTp 1510, dTs 1512 to the respective FET drive times Tp, Ts. The pulse 1506, 1508 is shown superimposed upon the instant pulse 1502, 1504. The total time of the second (adjusted) pulse is (Tp+Ts+dTp+dTs). The gain of the second pulse, relative to the first, is dTp. The peak current Icoil of the instant pulse is termed "Ipk". As shown in FIG. 13, the difference in charge between the two pulses is equal to the difference in area under their respective curves, disregarding any effects from ringing.

Figure 14:
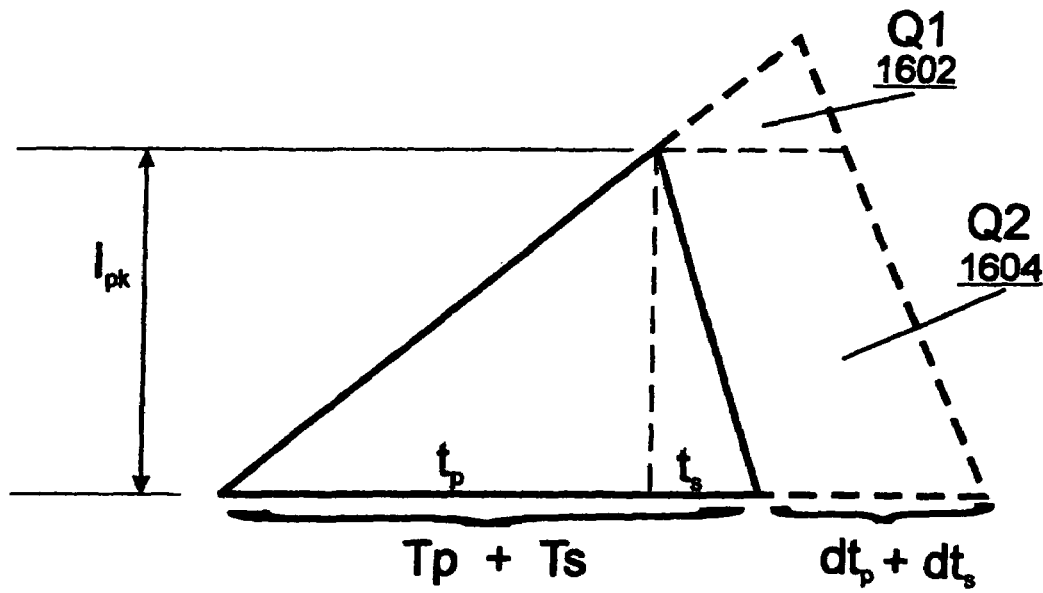

The difference in charge between the two pulses is the area Q1 1602 (the area above Ipk in FIG. 14) plus the area Q2 1604, or $$dQ = Q_1 + Q_2 \quad \text{[EQ 2]}$$

$$dQ = I_{PK}(dT_P + dT_S) + \frac{(V_{IN} - V_O)(dT_P + dT_S)dT_P}{2L}$$

We know that:

$$I_{PK} = \frac{(V_{IN} - V_O)T_P}{L}, \text{ and}$$

$$T_S = \frac{(V_{IN} - V_O)T_P}{V_O}, \text{ therefore}$$

$$(T_P + T_S) = \left(\frac{V_{IN}}{V_O}\right)T_P. \text{ Similarly,}$$

$$dT_S = \frac{(V_{IN} - V_O)dT_P}{V_O} \text{ and}$$

$$(dT_P + dT_S) = \left(\frac{V_{IN}}{V_O}\right)dT_P$$

By substitution, rewrite [EQ 2] as:

$$dQ = (dT_P + dT_S)\left[\frac{(V_{IN} - V_O)T_P}{L} + \frac{(V_{IN} - V_O)dT_P}{2L}\right],$$

or $$dQ = \left[\frac{T_P}{L} * \frac{V_{IN}}{V_O} * (V_{IN} - V_O)\right] * dT_P * \left[1 + \frac{dT_P}{2T_P}\right]$$

The maximum energy of the ring is the energy stored in the $C_{OSS}$ capacitance of the FETs, thus $$Q_{RING} = 2CV_O,$$

where C is the effective (charge average) $C_{OSS}$ at $V_O$.

Therefore the minimum time gain (dTp) to insure monotonicity is found by $$dT_P\left(1 + \frac{dT_P}{2T_P}\right) > \frac{2CV_O}{\left(\frac{T_P}{L}\right)\left(\frac{V_{IN}}{V_O}\right)(V_{In} - V_O)},$$

or $$dT_P\left(1 + \frac{dT_P}{2T_P}\right) > \left(\frac{2LC}{T_P}\right)\left(\frac{V_O^2}{V_{IN}(V_{IN} - V_O)}\right)$$

Assuming $dT_P \ll 2T_P$, we have $$dT_P > \frac{2LC(V_O)^2}{T_P * V_{IN}(V_{IN} - V_O)}, \quad \text{[EQ 3]}$$

or $$dT_P > \frac{2LC}{T_P}\left(\frac{V_O}{V_{IN}}\right)^2\left(\frac{1}{1 - (V_O/V_{IN})}\right)$$

The minimum time gain dTp should take into account the worst case conditions, which would be maximum Vo, minimum Vin and minimum Tp. Likewise, the designer should anticipate the maximum values of L and C, taking into account manufacturing tolerances, component aging, board parasitics and such.

The gain dTp must not exceed a value wherein unstable operation may result. Standard stability analysis techniques, such as Bode plots, may be used for this purpose. The worst case condition, for which the maximum gain should be determined, is with small values for L and C, low output voltage Vo, and high load current. So TpVSPLGain is determined by the designer, insuring that it is greater than the right-hand side of [EQ 3] and also to insure that TpVSPLGain*TpINC is less than the maximum determined by stability analysis. TpINC has a maximum magnitude value determined by equation [EQ 4] below, i.e.

|*Tp*INC|≦max {*Vdbh−Vtar, Vtar−Vdbl*}/VoltageRes.

The maximum of TpVSPLGain can be obtained by dividing the maximum gain obtained from the stability analysis by the maximum TpINC magnitude.

The relationship between Vin and Vo is $$V_O = V_{IN}\frac{T_P}{(T_P + T_S)},$$

therefore the smallest change in Vo available is $$\Delta V_O = V_{IN}\frac{1}{(TpCounts + TsCounts)},$$

where TpCounts and TsCounts are the times Tp and Ts expressed in counts, i.e. in units TimeRes=T/TimeSteps. For lowest power operation, wherein a solution may be found such that Vo is in equilibrium, $\Delta V_O$ must be less than or equal to one ADC quantum (defined as the voltage value of one least significant bit, or LSB, of the digital output of ADC 112A).

Once the initial conditions have been implemented and VSPL is running we begin applying the VSPL each time there is a duty cycle event. If Vo is changing, there are four possibilities: Vo being above/below Vtar, and for each of these Vo moving towards/away from Vtar. Of the four cases, in the two cases where Vo is moving towards Vtar, no adjustment is made. So now we are down to two cases: above and below Vtar, both moving away.

For both cases of Vo moving away from Vtar we now find the pulse adjustment at step 610 as follows. First we calculate the step size as $$T_P\text{INC}=T_S\text{INC}=((V_O-V_{TAR})/\text{VoltageRes}). \qquad [\text{EQ 4}]$$

VoltageRes is the resolution of the means for measuring Vo, such as ADC 112A. This was defined earlier as "quantum."

If not cycle skipping (step 608) we check for being in or near CCM (step 611). The test for this is $$(T_P+T_S+gb_1+gb_2)>=(T-T/\text{TimeSteps}) \qquad [\text{EQ 5}]$$

where:
gb1 is the propagation delay between FET 114 turning off and FET 116 turning on and gb2 is the propagation delay for the opposite case; and
TimeSteps is the number of the digital time units in period T; thus T/TimeSteps is the minimal time increment available when DPC 112D changes Tp or Ts by one digital unit.

If in or near CCM, calculate the pulse widths at step 613 as $$T_P=T_P-(T_P\text{Inc}*\text{vspl\_ccm\_gain}*(T/\text{TimeSteps})) \text{ and}$$

$$T_S=T-T_P. \qquad [\text{EQ 6}]$$

Here "vspl_ccm_gain" is the gain step (in counts of TimeRes quantities) that VSPL uses when in CCM instead of TpVSPLGain. The value vspl_ccm_gain*T/TimeSteps is the minimal gain. In some embodiments, it is much smaller than TpVSPLGain, which is used during DCM. A gain of about (1/10)*TpVSPLGain is suggested, i.e.

$$vspl\_ccm\_gain*T/\text{TimeSteps}=(1/10)*TpVSPLGain).$$

For the case of DCM and not near CCM (i.e. equation [EQ 5] does not hold), we find $$T_P=T_P-T_P\text{Inc}*T_P VSPLGain \text{ and}$$

$$T_S=T_S-T_S\text{Inc}*T_S VSPLGain. \qquad [\text{EQ 7}]$$

Figures 7A, 7B:
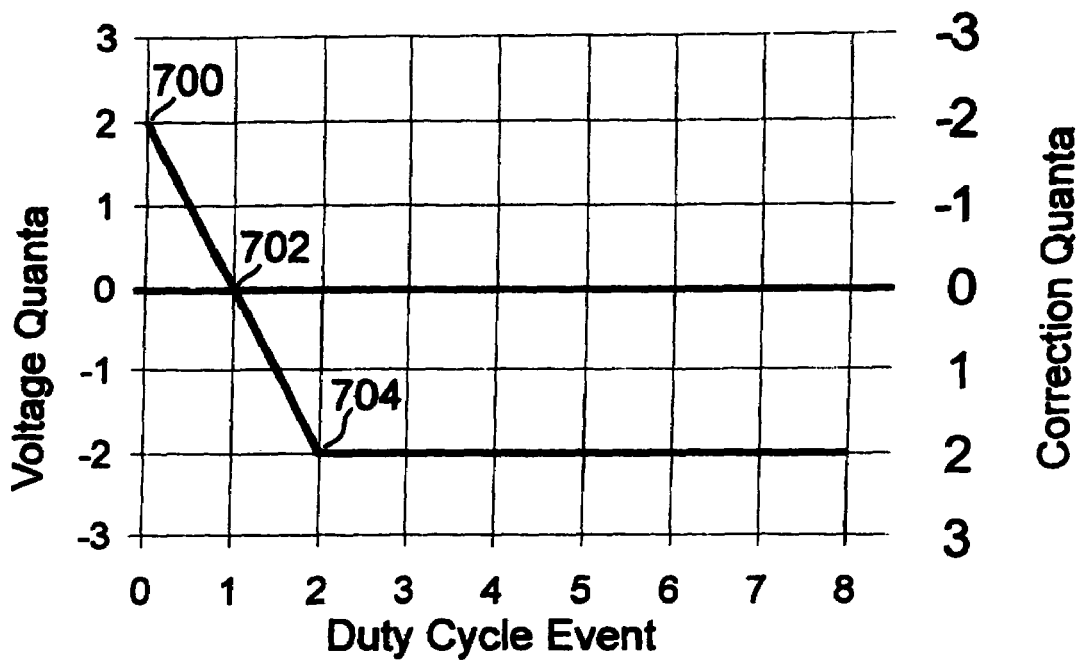
FIG. 7A is a graph of a converter output voltage according to some embodiments of the present invention.
FIG. 7B is a data table for FIG. 7A.

To illustrate a strategy that implements the above method consider an example shown in FIG. 7A, using the data from FIG. 7B and references to the flow chart of FIG. 6. Note that the horizontal axis of the graph represents duty cycle events, not a linear representation of time, in that the cycle skip count may be different from event to event. Thus "velocity" in FIG. 7B is the rate of change of Vo per duty cycle event, not per unit of time. One result of this approach is that the effective gain of the system is reduced when the skip count increases. The "Start Quanta" in FIG. 7B represent the voltage in units of the minimum resolvable increment of Vo relative to Vtar by the ADC. (A quantum of 1 corresponds to voltage VoltageRes described above.)

At data point 700 (duty cycle event 0), Vo is 2 quanta above Vtar, decreasing at a rate of 2 quanta per duty cycle event. For purposes of illustration assume VoSave=Vo at this point. Thus step 600 indicates we exit, taking no further action. At the next duty cycle event (#1), data point 702, Vo is at Vtar. Therefore we flow through the steps 600, 602, 603, 619 and exit. At the next duty cycle event, data point 704, Vo is at −2 quanta from Vtar. Note that the algorithm does not take the velocity magnitude into account, only the sign of the velocity and the magnitude of the displacement Vo−Vtar. The step sequence is now 600, 602, 603, 621, 618, 620, 624, 626, 606. Assuming we are not in or near CCM, Tp and Ts are decremented by one unit at step 624 as described above, then Vo is saved at step 626. At step 606 we calculate a correction of 2 quanta according to equations [EQ 4] which, when the new Tp and Ts values are applied at step 634, will exactly kill the Vo velocity.

As may be seen in the table of FIG. 7B, no further corrections are needed, as reflected in the flat line of the FIG. 7A graph after data point 704. Hence, each iteration will only execute step 600 then exit.

Figures 8A, 8B:
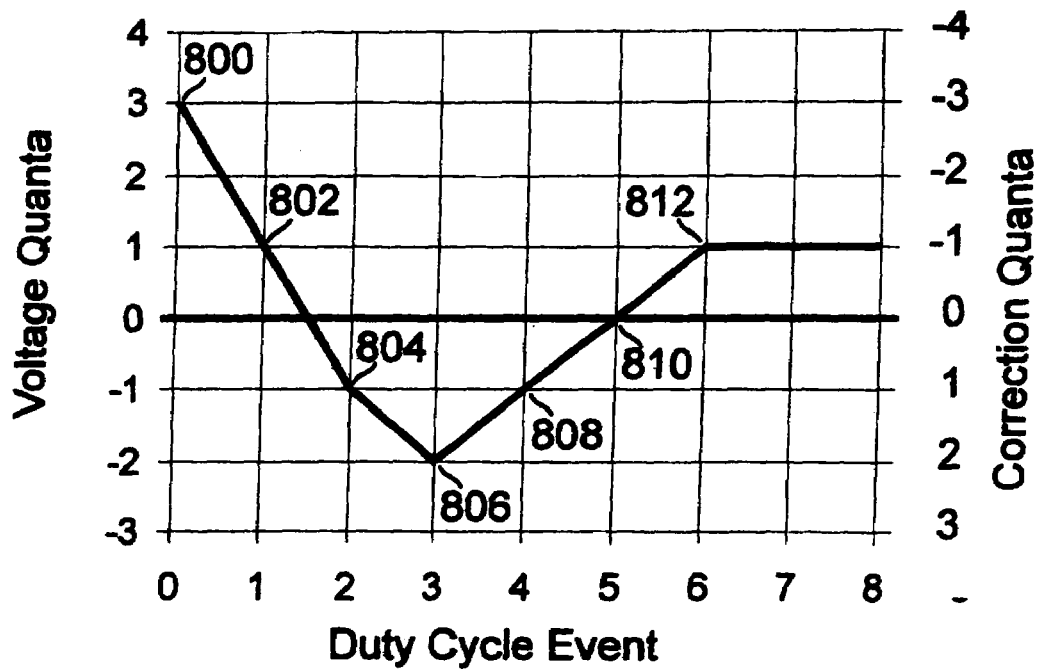
FIG. 8A is a graph of a converter output voltage according to some embodiments of the present invention.
FIG. 8B is a data table for FIG. 8A.

Another example is shown in FIG. 8A, based upon the data table of FIG. 8B. In this example VoSave is again equal to Vo at point 800, thus step 600 dictates no correction. At the next duty cycle event (#1, point 802) Vo is not equal to VoSave but can be seen to be moving towards Vtar, so flow 600, 602, 604, 614 and exit dictates no correction. At duty cycle event #2 (point 804) Vo is now below both Vtar and VoSave. Steps 600, 602, 603, 621, 618, 620, 624 (assuming not in or near CCM), 626 lead us to calculate TpINC and TsINC at step 606. Though the Vo velocity is −2 quanta, the algorithm has no knowledge of that. Since Vo measures to be 1 quanta below Vtar, a correction TpINC=+1 is calculated at step 606 according to equations [EQ 4]. Step 634 outputs the corrected Tp and Ts values for use by DPC 112D. The velocity of Vo is now −1 quanta per duty cycle event.

At the next duty cycle event 806, Vo is 2 quanta below Vtar at a −1 velocity. The flow of FIG. 6 corrects by TpINC=+2 quanta, causing Vo to go up at a rate of 1 quanta per duty cycle event. At the next two points (808 and 810) Vo is moving towards Vtar so no correction is performed. At duty cycle event #6 (point 812) Vo is above Vtar and above VoSave, so the program flow is 600, 602, 604 and 606, where a correction of TpINC=−1 quanta is calculated. Vo will now be stable (velocity=0) at 1 quanta above Vtar.

Obviously the Vo velocity will not usually be an exact integer number of the quanta. Rather it will depend on the pulse width Tp, Ts, and the resolution of DPC 112D and ADC 112A or other means used to measure the voltage. Vo may be jittered around Vtar. But as the voltage Vo changes and the effective pulse width (Tp/T1 where T1 includes a duty cycle event and the subsequent skip cycles as described below) changes, the phase relationship between pulses and ringing changes. Vo may eventually be an integer of the quanta and the VSPL will apply a correction factor TpINC which causes equilibrium. This is the lowest power condition with respect to the power consumed by controller 112, in that the only activity during each duty cycle will be the ADC conversion and the step 600.

In one embodiment of the present invention a larger dead band is used to expand the operational range in which VSPL may be used. However the designer may find it undesirable to allow Vo to be stable within the dead band while off target (Vtar) for extended periods of time. This local stability point may be eliminated by the addition of a counter 112CNT (FIG. 1) or some other time-out means to which the controller 112 may respond by changing the duty cycle to cause Vo to move in the direction of Vtar. Counter 112CNT can be a memory location accessible to processor 112M. The time-out may be implemented as a software loop, an event counter (counting clock ticks, or the number of times the loop of FIG. 6 is executed, or some other events), an RC time constant circuit to trigger a trigger signal, an external monitor (external timer or some other kind) or the like. An example of one response technique is shown as a flow chart in FIG. 9, the result of which is to move Vo from its local stability point towards Vtar when Vo is stable above Vtar beyond a certain time limit. One skilled in the art will understand that the same technique may be applied when Vo is stable below Vtar as well.

Figure 9:
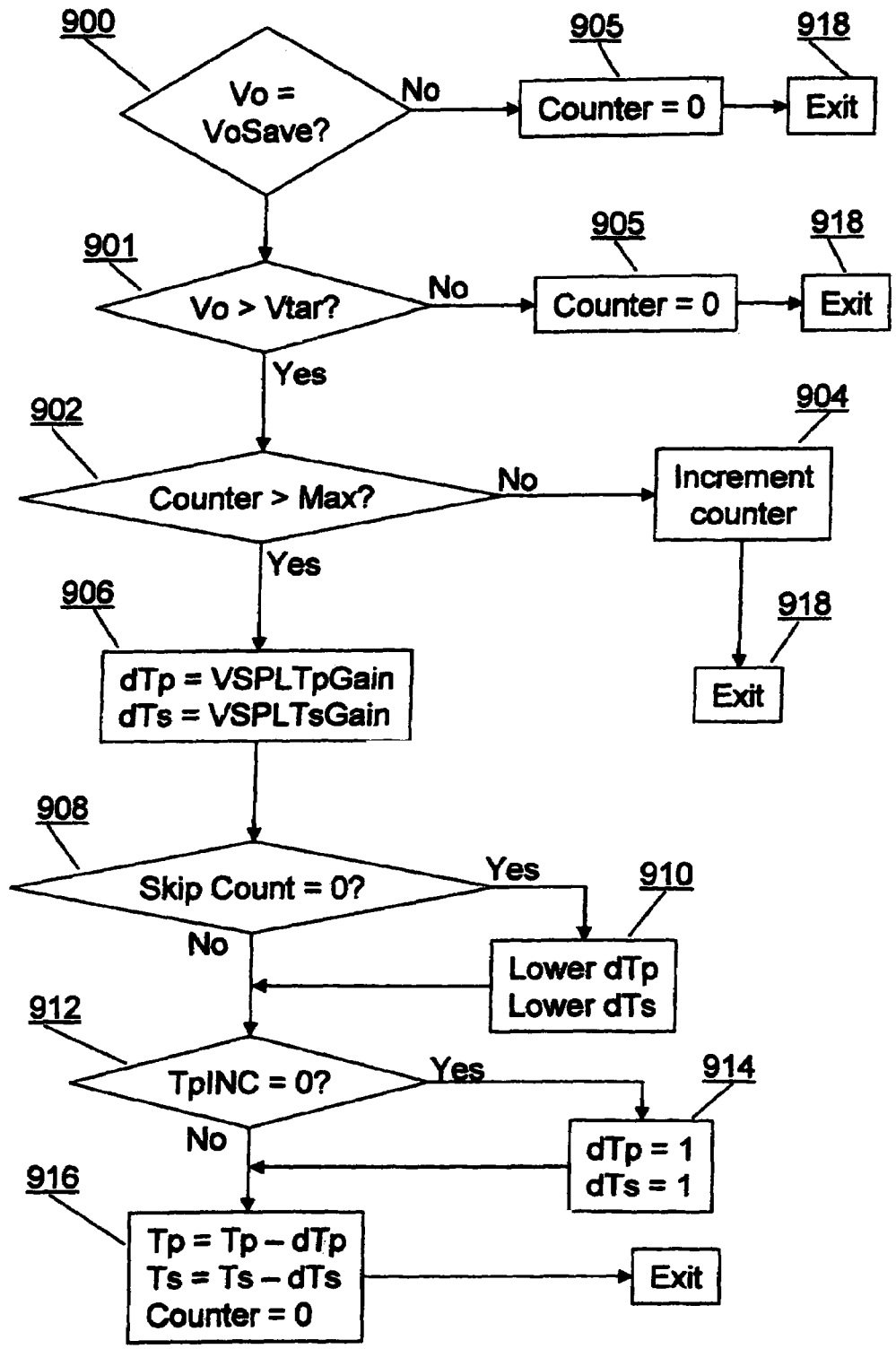
FIG. 9 is a flow chart of a method for controlling the converter output voltage to eliminate local stability according to some embodiments of the present invention.

Referring to FIG. 9, we first look at step 900 to see if Vo is not moving, i.e. if Vo=VoSave (dV=0). If Vo=VoSave, set the counter 112CNT to zero (step 905) and exit (step 918). Counter 112CNT was also initialized to zero during the initialization of controller 112. If Vo=VoSave at step 900, step 901 checks to see if Vo is above Vtar. If not, set the counter 112CNT to zero (step 905) and exit (step 918). If Vo is above Vtar, then at step 902 we check the counter 112CNT to see if it is above the maximum desired. If counter 112CNT is not above the maximum at step 902, we increment the counter (by 1) at step 904 and exit (step 918). If the counter is above the maximum desired, then we set the gain dTp, dTs at step 906 to some respective values VSPLTpGain, VSPLTsGain:

dTp=VSPLTpGain dTs=VSPLTsGain

These can be fixed values determined at the design time and intended to cause Vo to move towards Vtar, eliminating the local stability. In some embodiments, VSPLTpGain, VSPLTsGain are integer multiples of the respective values TpVSPLGain, TsVSPLGain described above. At step 908 we check for the possibility that we are close to a CCM condition by checking for a cycle skip count of 0, i.e. CS=1 (CS is one greater than the skip count). If the skip count is zero, we take step 910 to lower dTp, dTs. In one embodiment, dTp, dTs are shifted right by one bit, which is an integer division by 2, or by some other number of bits which can be a predefined number determined at the design time. Whether or not the skip count is zero, control from steps 908, 910 passes to step 912. At step 912 we check to insure that step 910 did not decrease dTp so much that no correction would be made. That is, if we first determined that a change should be made we insure that something in fact does change by resetting the gain TpINC to some minimum value at step 914. This value is shown as 1, but can be TpVSPL-Gain or some other value. The adjustments to Tp and Ts are then made at step 916 by subtracting the gain values dTp, dTs from Tp and Ts respectively. Also at step 916, the counter 112CNT is reset to zero, then we exit (step 918). An example of a C language source code for elimination of local stability is provided in APPENDIX 3.

The invention is not limited to a particular sequence of operations. The method of FIG. 6 can be performed before or after the method of FIG. 9 in each time period T, or in each duty cycle, to determine the Tp and Ts values for the next T period or the next duty cycle. These methods may be performed concurrently (e.g. by different microprocessor circuits). Of note, if Vo=VoSave, then the FIG. 6 method will leave Tp and Ts unchanged, and any changes by the method of FIG. 9 will thus not be inconsistent with the changes of the method of FIG. 6. The reverse is also true (if Vo≠VoSave). The two methods can be combined. Step 900 is identical to step 600. If Vo=VoSave at step 600, the control could pass to step 901. If Vo≠VoSave, the control could pass to step 602.

Some embodiments use the method of FIG. 6 but not of FIG. 9 or vice versa.

Figure 16:
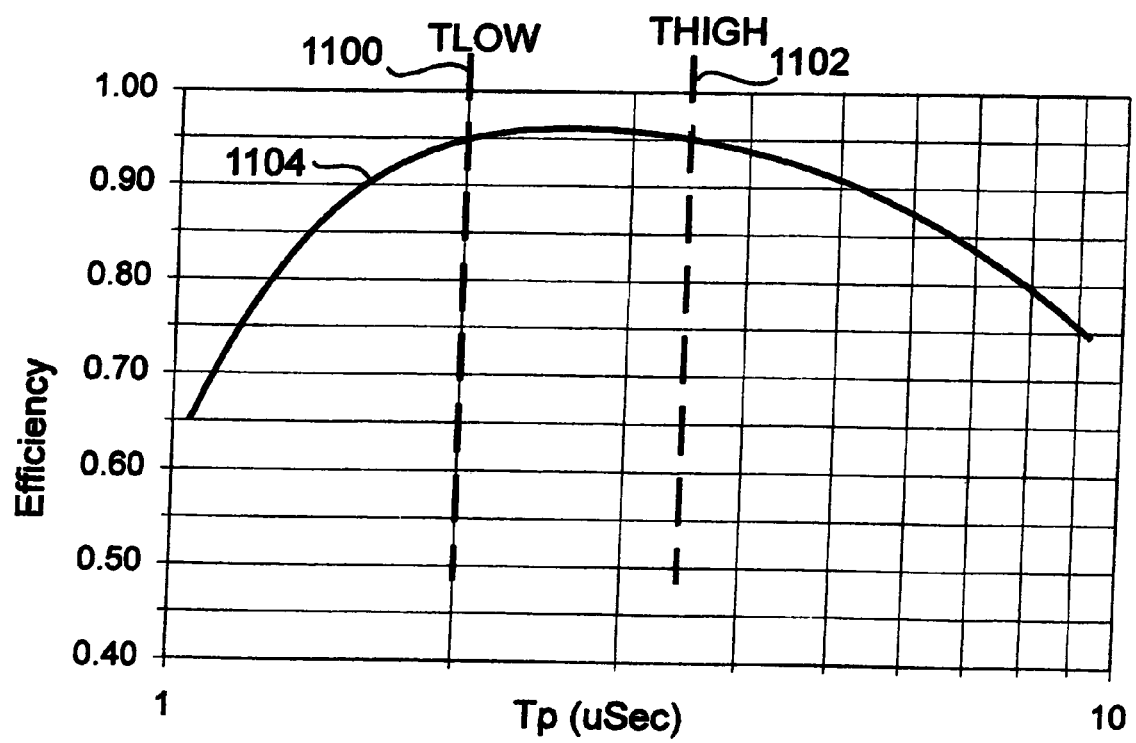
FIG. 16 is a graph relating the efficiency of a driver circuit to a control FET on time in one embodiment of the present invention.

Next we determine the proper cycle skipping count. We want to avoid a very narrow Tp and Ts and do so by making the duty cycle pulses progressively wider but farther apart. This strategy is designed to maintain coil current pulses within a range that will be efficient for the given drive circuit (which includes transistors 114 and 116, coil 118), regardless of the load. The efficiency is measured as a percentage of the charge provided at terminal 122 per unit of charge provided by power source 98. FIG. 16 shows the efficiency of an example drive circuit, plotted as line 1104, as a function of the Tp parameter (shown in microseconds). If the range of the load current is very wide, implying Tp and Ts would very from very narrow to very wide, the efficiency would suffer at those conditions away from a center value. Some embodiments of the present invention optimize the efficiency across a wide range of loads by adjusting the cycle skip count and Tp to keep the Tp pulse times within a narrow range. The designer determines a minimum Tp, termed "TLOW" 1100 and a maximum Tp, termed "THIGH" 1102. Keeping Tp values within this range keeps the drive circuit near its maximum efficiency condition. The cycle skip count is adjusted accordingly so that the energy delivered to the load is correct.

Figure 17:
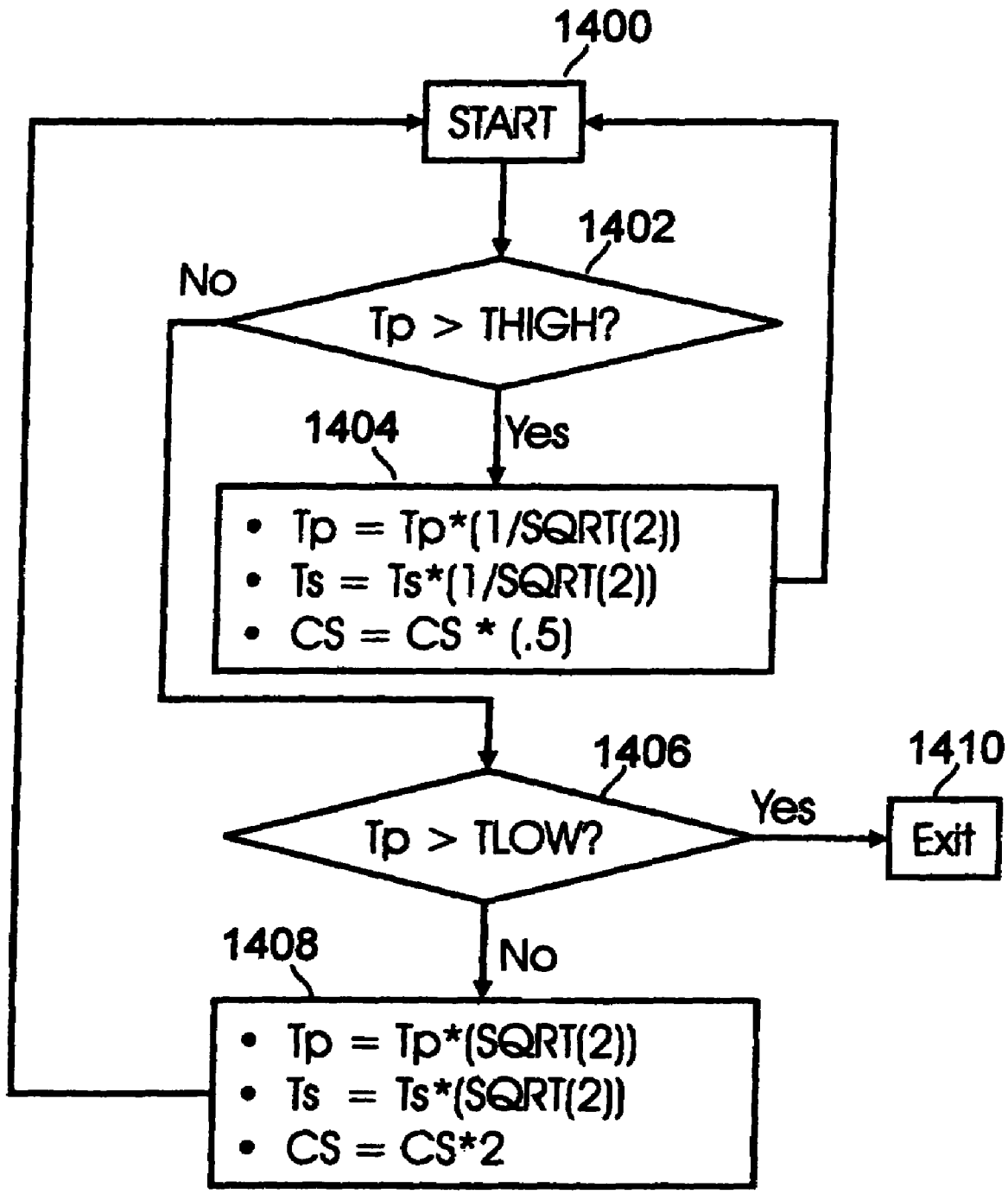
FIG. 17 is a drive circuit optimization program flow chart according to one embodiment of the present invention.

Looking at FIG. 17, the method begins with a loop comprised of steps 1400, 1402, and 1404 which compares Tp to THIGH 1102 and, if Tp is greater than THIGH, divides Tp and Ts by square root of 2 (by $\sqrt{2}$) while halving the skip count until Tp is less than THIGH 1102. (In some embodiments, Tp and Ts are multiplied by 0.75 as an approximation of division by square root of 2. Halving the skip count can be replaced by a right shift by 1 bit. The invention is not limited to specific computations.) This loop lowers the pulse width from that which was previously calculated, while providing approximately the same energy.

If Tp is below THIGH 1102, we leave step 1402 and go to step 1406 to determine if Tp is above TLOW 1100. If not, Tp and Ts are multiplied by $\sqrt{2}$ (i.e. by about 1.5) and the skip count is doubled, again keeping the total charge approximately constant. From 1408 we return to 1400 to check Tp against THIGH 1102. The flow is not exited until Tp is between TLOW 1100 and THIGH 1102, signified by "Yes" at step 1406. To ensure that there is no infinite loop, one can choose TLOW and THIGH such that both are positive numbers and THIGH<TLOW*$\sqrt{2}$ (or THIGH<TLOW*f where f is the divisor at step 1404 and the multiplier at step 1408). In some embodiments, a check is performed to make sure that SkipCnt is not zero. Steps 1402-1408 are not executed if SkipCnt=0. In some embodiments, if SkipCnt=0 and Tp<TLOW, then SkipCnt is increased by some other means that doubling, e.g. SkipCnt is set to 1 or some other positive value.

In one embodiment TLOW is defined as 0.7*T and THIGH is defined as 0.95*T. Other values may be selected by the designer.

The result of this method is a cycle frequency that is a sub-harmonic of the fastest loop time T corresponding to the frequency of CS=1 (skip count=0). The process of doubling the skip count and scaling Tp and Ts calculates solutions that offer a consistent amount of energy. We are looking for the solution which keeps the pulse widths in the region for which the efficiency of the drive circuit is optimized. In some embodiments the strategy is to first calculate the energy needed (that is, Tp from the VSPL algorithm), then change the skip count until the recalculated pulse width is between TLOW and THIGH, which in turn keeps the efficiency high regardless of the load, as FIG. 16 shows.

The designer may wish to limit the maximum skip count. In the case wherein the load would require a skip count in excess of the maximum allowed by the designer, Tp will be less than TLOW. In some such embodiments, when the system requires the skip count in excess of the maximum, the system is placed in PFM. Since we are using a subharmonic of a known frequency we know the family of frequencies precisely, and can therefore set a maximum skip count to insure we never get down to audio range, hit an IF frequency in a radio, or cause other similar concerns.

As noted above, the invention is not limited to particular computations. For example, instead of checking for Tp>THIGH at step 1402, one can check for Tp≧THIGH. In some embodiments, at step 1406, instead of checking for Tp>TLOW, one can check for Tp≧TLOW.

In some embodiments, at steps 1402 and/or 1406, the microprocessor 112M checks for a condition that some increasing function of Tp is greater than THIGH or TLOW, or greater than or equal to THIGH or TLOW. The increasing function of Tp can be Tp+Ts, in which case the steps 1402 and 1406 are as follows:

Step 1402: Tp+Ts>THIGH (or Tp+Ts≧THIGH);
Step 1406: Tp+Ts>TLOW (or Tp+Ts≧TLOW).

In some embodiments, if Tp+Ts becomes greater than T, the converter is moved to CCM, or Tp and Ts are reduced for the critical conduction condition (FIG. 4). Thus, the controller 112 ensures that Tp+Ts is between some values TLOW and THIGH, with or without checking that Tp is in some desired range.

Figure 15A:
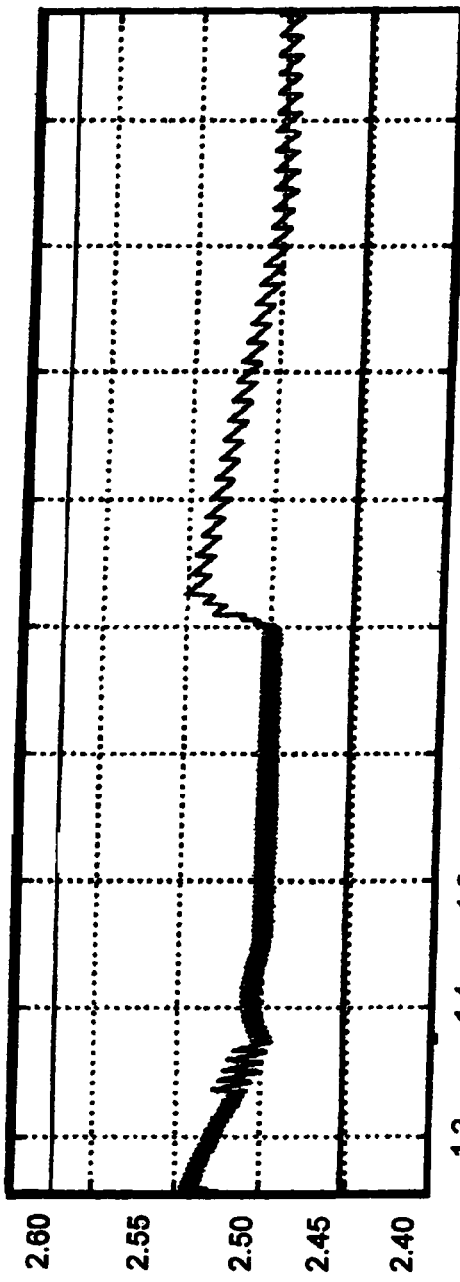
FIG. 15A is a graph of a converter's output voltage versus time in a simulation according to one embodiment of the present invention.
Figure 15B:
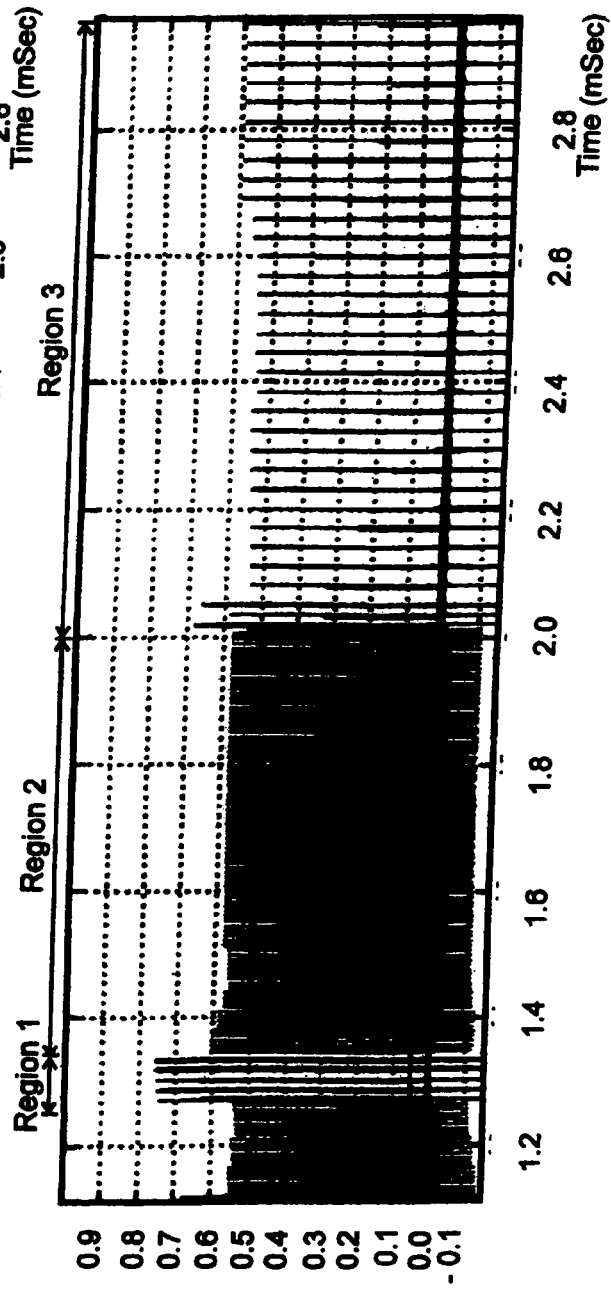
FIGS. 15B, 15C are graphs of a converter's coil current versus time in a simulation according to one embodiment of the present invention.
Figure 15C:
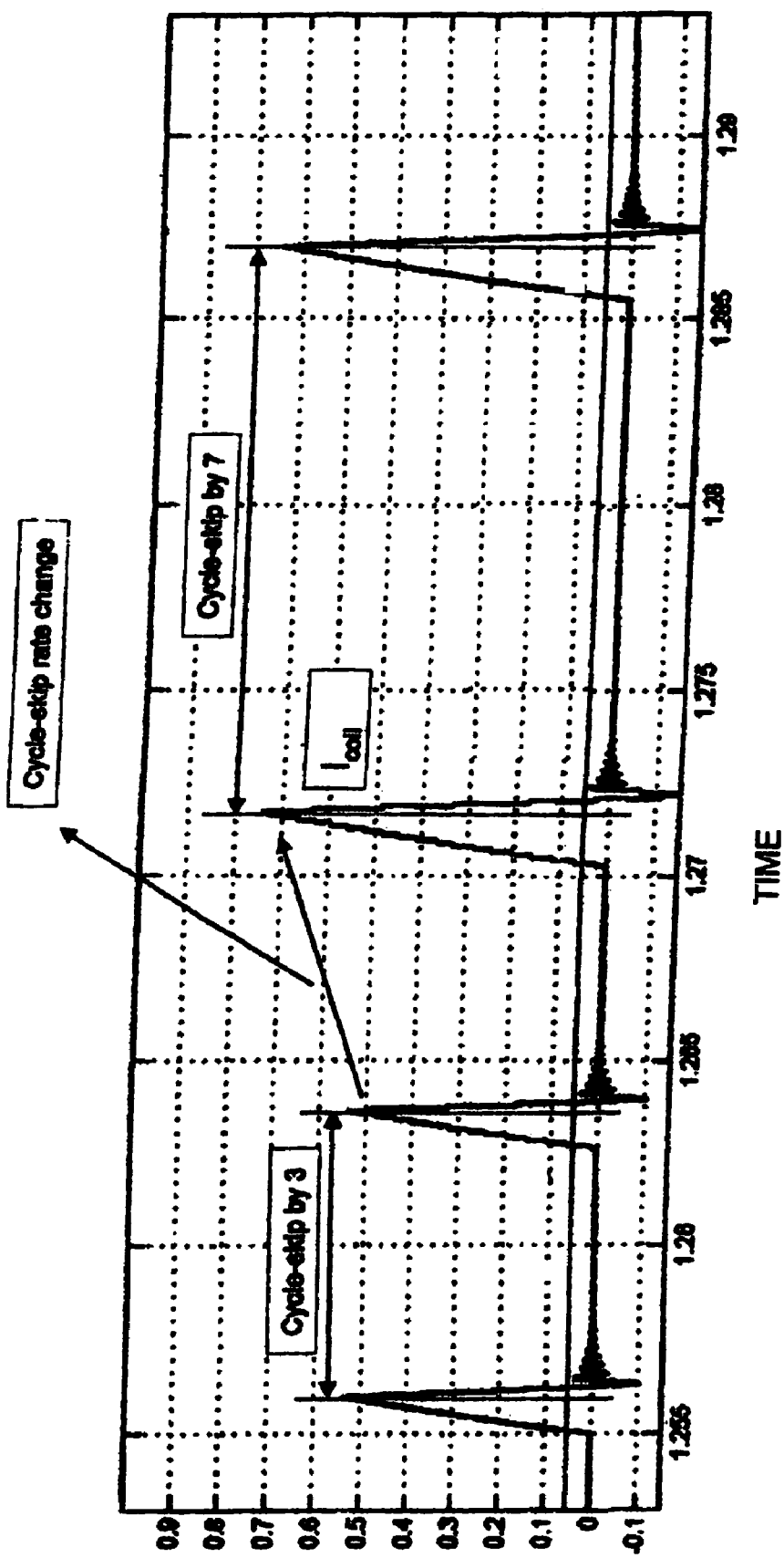

FIG. 15 is an example of a simulation of one embodiment wherein the skip count changes in response to a change in the load, thus keeping the average power delivered per time within the desired range. FIG. 15A presents output voltage Vo (in volts) over time (in milliseconds). FIG. 15B shows the current pulses (in amperes) injected into the driver circuit, hence the coil current. In Region 1 the cycle skip count ("CS", the same as SkipCnt in FIG. 17) is 7, with the pulse peaks of about 700 mA. As Vo approaches a Vtar of 2.5 volts, CS is reduced to 3, stabilizing the Vo at about Vtar for Region 2. Close examination indicates that Vo jitters a small amount above and below Vtar. At 2.0 seconds the load current goes down and Vo goes up in Region 3 to about 2.55 volts (above Vtar). CS is increased to 7, reducing the energy injected into the load, causing Vo to return to Vtar. FIG. 15C is a larger scale diagram showing how the skip count changes along with Tp in Region 1.

It would be clear to the ordinary artisan that the technique described is beneficial to any drive circuit, especially if the load current varies in a wide range.

The invention is not limited to multiplying or dividing Tp or Ts by $\sqrt{2}$ and doubling or halving the skip count. For example, Tp and Ts can be multiplied or divided by $2*\sqrt{2}$ to increase or decrease the charge flowing into coil 118 by a factor of 4, and the skip count can be multiplied or divided by 4. Other computational schemes can also be used to provide efficient operation by changing Tp and/or Ts and adjusting the skip count based on the load conditions. Appendices 1 and 4 illustrate C code for different embodiments for the skip count adjustments to obtain high efficiency (FIG. 16). The invention is not limited to these embodiments.

Figure 11:
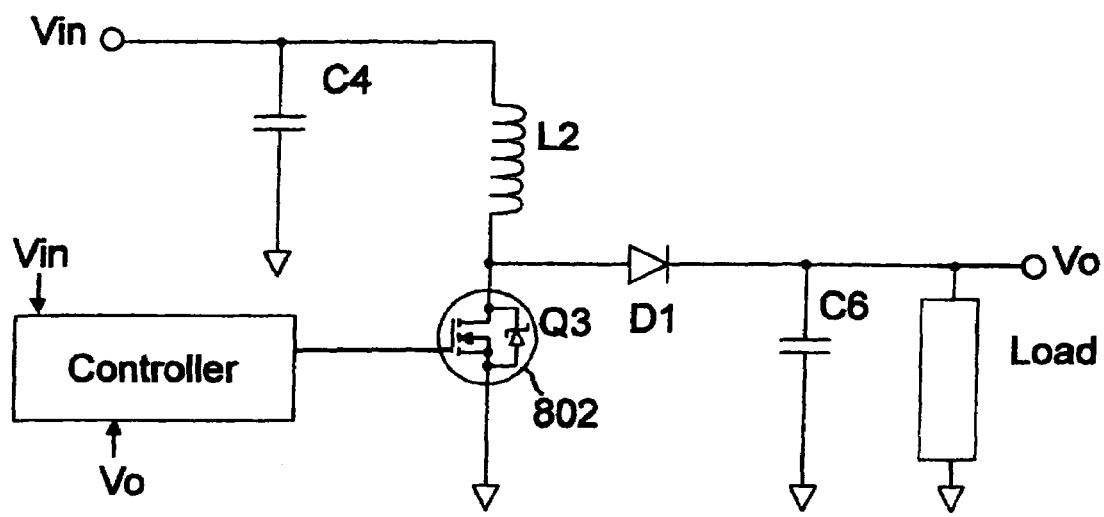
FIG. 11 is a circuit diagram of a typical non-synchronous boost power converter.
Figure 12:
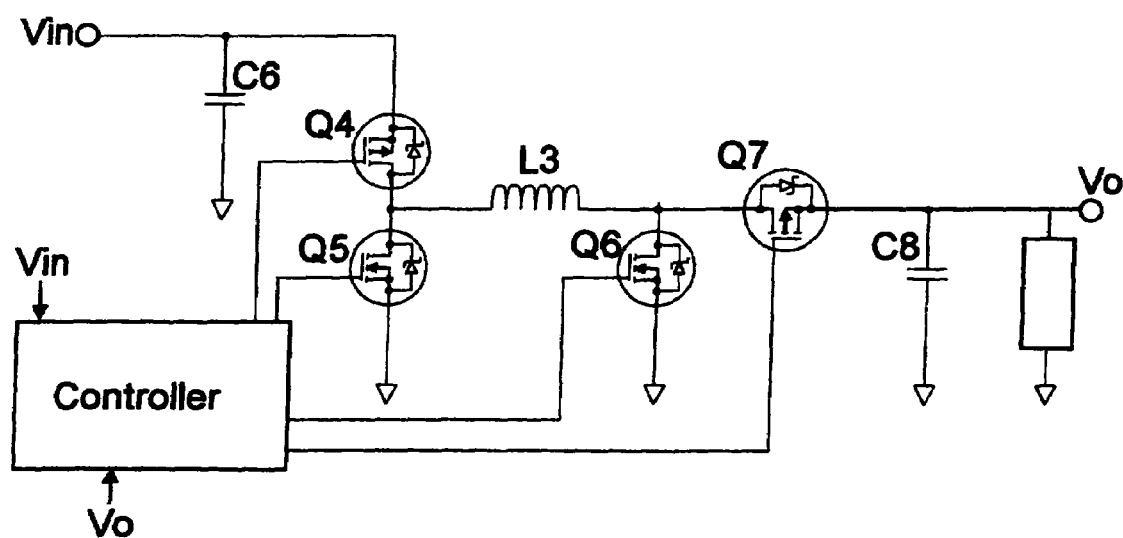
FIG. 12 is a circuit diagram of a typical buck/boost power converter circuit.

The invention is applicable to any switching power converter topology, including a non-synchronous boost or a multiple transistor buck/boost supply, examples of which are shown in FIG. 11 and FIG. 12. These standard topologies are well known to those skilled in the art; further explanation is unnecessary.

Some of the source code presented in the appendices uses integer math rather than floating point. Time, for example, is represented in "counts" rather than seconds. A count refers to the smallest subdivision of a time period T utilized by the DPC. A count may also refer to the voltage represented by one LSB of an ADC.

Tp in terms of time is converted to counts per $$T_P Counts = \frac{T_P}{TimeRes},$$

where

TimeRes=T/TimeSteps.
In one embodiment TimeSteps=$2^{10}$.
Voltage is converted to counts per
VoCounts=Vo/VoltageRes.

The invention is not limited to the embodiments described above. The invention includes computer readable storage media comprising computer instructions for microprocessor 112M to implement the methods of the invention. The invention includes computer data signals embodied in carrier waves and comprising computer instructions for implementing the methods of the invention. Some or all of the functions of controller 112M can be hardwired rather than software programmable. The invention is not limited to combining all of the techniques described above. Some embodiments use less than all of the techniques described above. Also, one or more of the techniques described above can be combined with other techniques. The invention is not limited to any particular circuitry, voltage values, and other parameters. The invention is defined by the appended claims.

APPENDIX 1

VSPL PROGRAM C MODEL EXAMPLE

```
//VSPL Algorithm
    if (Vo != VoSave)      // if Vo is changing
    {
        if (Vo > Vtar)     // and Vo is above its target
        {
            if ((Vo–VoSave) > 0)   // and Vo is moving up
            {
                flag_inc = 1;      // then adjust Tp and Ts
            }
        }
        if (Vo < Vtar)     // if Vo is below its target
        {
            if ((Vo–VoSave) < 0)   // and Vo is moving down
            {
                flag_inc = 1;      // then adjust Tp and Ts
                // first walk over the Coss ring
                if (VoSave >= Vtar)
                {
                    if ((pTp + pTs + gb1+gb2)>= (T – T/TimeSteps))
                    { // if we are in CCM or close to it
                        pTp –= T/TimeSteps; // lower Tp gain
                        pTs += T/TimeSteps;
                    }
                    else
                    {
                        pTp –= T/TimeSteps; // lower Tp gain
                        pTs –= T/TimeSteps;
                    }
                }
            }
        }
        VoSave = Vo;
    }
```

APPENDIX 1-continued

VSPL PROGRAM C MODEL EXAMPLE

```c
// VSPL PWM changes made here
    if (flag_inc)
    {
        real_T TpInc = (Vo-Vtar)/VoltageRes;
        real_T TsInc = (Vo-Vtar)/VoltageRes;
        if ((CS == 1) && (PFM == 0)) // if not cycle skipping
        {
            if ((pTp + pTs + gb1+gb2)>= (T - T/TimeSteps))
            {
                // if in CCM or close to it; reduce gain
                real_T vspl_ccm_gain = 4;
                if (vspl_rate3)      vspl_ccm_gain = 1;
                else if (vspl_rate2) vspl_ccm_gain = 2;
                else if (vspl_rate1) vspl_ccm_gain = 2;
                pTp -= TpInc * vspl_ccm_gain * T/TimeSteps;
                pTs = T - pTp;
                vspl_rate1 = 1;
                vspl_rate2 = 1;
                vspl_rate3 = 1;
            }
            else
            {
                // In DCM; use high gain
                pTp -= TpInc * pTpVSPLGain;
                pTs -= TsInc * pTsVSPLGain;
            }
        }
        else
        {
            // Cycle skipping is DCM by definition
            pTp -= TpInc * pTpVSPLGain;
            pTs -= TsInc * pTsVSPLGain;
        }
        // Now adjust pulse width
        if ((pTp+pTs) > Thigh)
        {
            if (CS > 1)
            {
                pTp = pTp/sqrt(2.0);
                pTs = pTs/sqrt(2.0);
                CS = CS/2;
            }
        }
        else if (((pTp+pTs) < Tlow) && (PFM == 0))
        {
            pTp = pTp*sqrt(2.0);
            pTs = pTs*sqrt(2.0);
            CS = CS*2;
            if (CS > VSPLMaxCS)
            {
                pTp = 0;
                pTs = 0;
                PFM = 1;
            }
        }
        if ((CS == 1) && (PFM == 0)) // if not cycle skipping
        {
            if ((TpInc < 0) && ((pTp + pTs) > T)) // in CCM?
            {
                // Attempt to transistion from DCM to CCM
                // Clip PWM to critical conduction
                pTp = T * Vtar / Vin;
                pTs = T - pTp;
            }
        }
        //Put out the chosen duty cycle
        pTp = pTp - Tcorr;        // Correct for any timing issues
        pTs = pTs - (gb1+gb2);    // Insure non-overlap
        Tdc = T - pTp - pTs - (gb1+gb2); // Dead time?
        if (Tdc < 0) Tdc = 0;     // Insure non-negative
    }
    else
    {
        if (vspl_rate3)       vspl_rate3 = 0;
        else if (vspl_rate2)  vspl_rate2 = 0;
        else if (vspl_rate1)  vspl_rate1 = 0;
    }
//  Exit
```

APPENDIX 2

VSPL PROGRAM C MODEL EXAMPLE

```c
touched = 0;
if (VoCounts != VSPLVoSave)    // if Vo is changing
{
    // if the output voltage is above its target
    if (VoCounts > VtarCounts)
    {
        // if the dv/dt of the output voltage is positive
        // then adjust pulse
        if (VoCounts > VSPLVoSave)
        {
            TpInc = VSPLTpGainCounts*abs(VoCounts-VtarCounts);
            TsInc = VSPLTsGainCounts*abs(VoCounts-VtarCounts);
            if (TpInc > VSPLTpMaxGainCounts)
            {
                TpInc = VSPLTpMaxGainCounts;
                TsInc = VSPLTsMaxGainCounts;
            }
            if (VSPLCS == 1)
            {
                TpInc = TpInc >> VSPLCCMGainDiv;
                TsInc = TsInc >> VSPLCCMGainDiv;
            }
            VSPLpTpCounts   -= TpInc;
            VSPLpTsCounts   -= TsInc;
            touched          = 1;
        }
    }
    // if the output voltage is below its target
    else if (VoCounts < VtarCounts)
    {
        // if the dv/dt of the output voltage is negative
        // then adjust pulse
        if (VoCounts < VSPLVoSave)
        {
            TpInc = VSPLTpGainCounts*abs(VoCounts-VtarCounts);
            TsInc = VSPLTsGainCounts*abs(VoCounts-VtarCounts);
            if (TpInc > VSPLTpMaxGainCounts)
            {
                TpInc = VSPLTpMaxGainCounts;
                TsInc = VSPLTsMaxGainCounts;
            }
            if (VSPLCS == 1)
            {
                TpInc = TpInc >> VSPLCCMGainDiv;
                TsInc = TsInc >> VSPLCCMGainDiv;
            }
            VSPLpTpCounts += TpInc;
            VSPLpTsCounts += TsInc;
            // Adapt by walking over the Coss ring
            if (VSPLVoSave >= VtarCounts)
            {
                VSPLpTpCounts -= 1;
                VSPLpTsCounts -= 1;
            }
            touched = 1;
        }
    }
}
if (touched != 0) VSPLVoSave = VoCounts;
```

APPENDIX 3

ELIMINATION OF LOCAL STABILITY C MODEL

```
// Eliminate local equilibrium points above Vtar
if (touched == 0)
    if (IVoutCounts == VoutCounts)
        if (VoutCounts > VtarCounts)
        {
            if (VSPLcounter > 2)
            {
                TpInc = VSPLTpGainCounts;
                TsInc = VSPLTpGainCounts;
                if (VSPLCS == 1)
                {
                    TpInc      >>= VSPLCCMGainDiv;
                    TsInc      >>= VSPLCCMGainDiv;
                }
                if (TpInc == 0)
                {
                    TpInc       = 1;
                    TsInc       = 1;
                }
                VSPLpTpCounts  -= TpInc;
                VSPLpTsCounts  -= TsInc;
                touched         = 1;
            }
            else
            {
                VSPLcounter++;
            }
        }
if (touched != 0) VSPLVoutSave = VoutCounts;
if (touched != 0) VSPLcounter = 0;
```

APPENDIX 4

ADAPTIVE CYCLE SKIP RATE C MODEL

```
// Adapt cycle skip rate
if (touched)
{
    if (VSPLpTpCounts > VSPLTpCCMCounts)
    {
        if (VSPLCS > VSPLMinCS)
        {
            VSPLpTpCounts  = VSPLpTpCounts - VSPLpTpCounts/4;
            VSPLpTsCounts  = VSPLpTsCounts - VSPLpTsCounts/4;
            VSPLCS         = VSPLCS/2;
        }
        else
        {
            VSPLpTpCounts  = VSPLTpCCMCounts;
            VSPLpTsCounts  = VSPLTsCCMCounts;
        }
    }
    else if (VSPLpTpCounts < (VSPLTpCCMCounts - VSPLTpCCMCounts/4))
    {
        if (VSPLCS < VSPLMaxCS)
        {
            VSPLpTpCounts  = VSPLpTpCounts + VSPLpTpCounts/2;
            VSPLpTsCounts  = VSPLpTsCounts + VSPLpTsCounts/2;
            VSPLCS         = VSPLCS*2;
        }
    }
}
```

We claim:

1. A method for regulating an output voltage of a power converter, the method comprising intermittently coupling an input power source to provide a current flow to generate the output voltage, wherein in consecutive time cycles T1, T2, ... Tn, ... the input power source is coupled for respective time durations $Tp \geq 0$ where $Tp=Tp(T1)$, $Tp(T2), \ldots Tp(Tn), \ldots$ in respective cycles T1, T2, ... Tn, ..., the method further comprising determining the durations Tp, wherein determining Tp comprises:

(1) obtaining a cycle skip count representing a number of cycles with Tp=0 between cycles with Tp>0;

(2) for at least one cycle Ti for which Tp(Ti)>0, determining whether or not a condition 1 holds true, wherein the condition 1 is either (i) a condition that Tp(Ti) is below a predetermined value TLOW, or (ii) a condition that Tp(Ti) is less than or equal to TLOW, or (iii) a condition that a predefined increasing function of Tp(Ti) is below TLOW, or (iv) a condition that said increasing function of Tp(Ti) is less than or equal to TLOW;

(3) if the condition 1 holds true, then:

(3A) increasing Tp(Ti); and (3B) increasing the skip count.

2. The method of claim 1 wherein the operations (2), (3) are performed repeatedly at least until a condition 2 holds true, where the condition 2 is either (i) a condition that Tp(Ti) is greater than TLOW, or (ii) a condition that Tp(Ti) is greater than or equal to TLOW, or (iii) a condition that said increasing function of Tp(Ti) is greater than TLOW, or (iv) a condition that said increasing function of Tp(Ti) is greater than or equal to TLOW.

3. The method of claim 1 wherein in the operation (3A), Tp(Ti) is multiplied by about square root of 2, and in the operation (3B) the skip count is multiplied by 2.

4. The method of claim 1 further comprising, at least in each cycle Tj in which Tp(Tj)>0, at least when the input power source is not coupled to provide said current flow, coupling the converter for a time duration Ts=Ts(Tj) to reduce said current flow;

wherein said increasing function of Tp(Ti) is equal to $$Tp(Ti)+Ts(Ti);$$

wherein the condition 1 is either said condition that said increasing function of Tp(Ti) is below TLOW, or said condition that said increasing function of Tp(Ti) is less than or equal to TLOW.

5. The method of claim 4 wherein the converter is not coupled to reduce said current flow except in said time durations Ts; and the operation (3) further comprises increasing Ts(Ti).

6. The method of claim 1 wherein determining Tp further comprises:

(4) determining whether or not a condition 3 holds true, wherein the condition 3 is either (i) a condition that Tp(Ti) is greater than a predetermined value THIGH, or (ii) a condition that Tp(Ti) is greater than or equal to THIGH, or (iii) a condition that said increasing function of Tp(Ti) is greater than THIGH, or (iv) a condition that said increasing function of Tp(Ti) is greater than or equal to THIGH;

(5) if the condition 3 holds true, then:

(5A) decreasing Tp(Ti); and (5B) decreasing the skip count.

7. The method of claim 6 wherein the operations (4), (5) are performed repeatedly at least until a condition 4 holds true, wherein the condition (4) is either a condition that Tp(Ti) is between TLOW and THIGH, or a condition that said increasing function of Tp(Ti) is between TLOW and THIGH.

8. The method of claim 6 wherein in the operation (5A), Tp(Ti) is divided by about square root of 2, and in the operation (5B) the skip count is divided by 2 or shifted right by one bit.

9. The method of claim 1 wherein determining Tp further comprises limiting the skip count to a predetermined maximum value.

10. The method of claim 1 wherein the operation (3) further comprises:
before increasing the skip count, determining if the increased skip count would exceed a predetermined maximum value;
if the increased skip count would exceed the predetermined maximum value, then omitting the steps (3A), (3B).

11. A method for regulating an output voltage of a power converter, the method comprising intermittently coupling an input power source to provide a current flow to generate the output voltage, wherein in consecutive time cycles T1, T2, . . . Tn, . . . the input power source is coupled for respective time durations Tp≧0 where Tp=Tp(T1), Tp(T2), . . . Tp(Tn), . . . in respective cycles T1, T2, . . . Tn, . . . , the method further comprising determining the durations Tp, wherein determining Tp comprises:
(1) obtaining a cycle skip count representing a number of cycles with Tp=0 between cycles with Tp>0;
(2) determining whether or not a condition 1 holds true, wherein the condition 1 is either (i) a condition that Tp(Ti) is above a predetermined value THIGH, or (ii) a condition that Tp(Ti) is above or equal to THIGH, or (iii) a condition that a predefined increasing function of Tp(Ti) is above THIGH, or (iv) a condition that said increasing function of Tp(Ti) is greater than or equal to THIGH;
(3) if the condition 1 holds true, then:
(3A) decreasing Tp(Ti); and
(3B) decreasing the skip count.

12. The method of claim 11 wherein the operations (2), (3) are performed repeatedly at least until a condition 2 holds true, wherein the condition 2 is either (i) a condition that Tp(Ti) is less than THIGH, or (ii) a condition that Tp(Ti) is less than or equal to THIGH, or (iii) a condition that said increasing function of Tp(Ti) is less than THIGH, or (iv) a condition that said increasing function of Tp(Ti) is less than or equal to THIGH.

13. The method of claim 11 wherein in the operation (3A), Tp(Ti) is divided by about square root of 2, and in the operation (3B) the skip count is either divided by about 2 or shifted right by one bit.

14. The method of claim 11 further comprising, at least in each cycle Tj in which Tp(Tj)>0, at least when the input power source is not coupled to provide said current flow, coupling the converter for a time duration Ts=Ts(Tj) to reduce said current flow;
wherein said increasing function of Tp(Ti) is equal to Tp(Ti)+Ts (Ti);

wherein the condition 1 is either said condition that that said increasing function of Tp(Ti) is above THIGH, or said condition that said increasing function of Tp(Ti) is greater than or equal to THIGH.

15. The method of claim 14 wherein the converter is not coupled to reduce said current except in said time durations Ts; and
the operation (3) further comprises decreasing Ts(Ti).

16. A power converter comprising circuitry for performing the method of claim 1.

17. The power converter of claim 16 wherein the operations (2), (3) are performed repeatedly at least until a condition 2 holds true, where the condition 2 is either (i) a condition that Tp(Ti) is greater than TLOW, or (ii) a condition that Tp(Ti) is greater than or equal to TLOW, or (iii) a condition that said increasing function of Tp(Ti) is greater than TLOW, or (iv) a condition that said increasing function of Tp(Ti) is greater than or equal to TLOW.

18. The power converter of claim 16 wherein in the operation (3A), Tp(Ti) is multiplied by about square root of 2, and in the operation (3B) the skip count is multiplied by 2.

19. The power converter of claim 16 further comprising, at least in each cycle Tj in which Tp(Tj)>0, at least when the input power source is not coupled to provide said current flow, coupling the converter for a time duration Ts=Ts(Tj) to reduce said current flow;
wherein said increasing function of Tp(Ti) is equal to Tp(Ti)+Ts(Ti);

wherein the condition 1 is either said condition that said increasing function of Tp(Ti) is below TLOW, or said condition that said increasing function of Tp(Ti) is less than or equal to TLOW.

20. The power converter of claim 19 wherein the converter is not coupled to reduce said current flow except in said time durations Ts; and
the operation (3) further comprises increasing Ts(Ti).

21. The power converter of claim 16 wherein determining Tp further comprises:
(4) determining whether or not a condition 3 holds true, wherein the condition 3 is either (i) a condition that Tp(Ti) is greater than a predetermined value THIGH, or (ii) a condition that Tp(Ti) is greater than or equal to THIGH, or (iii) a condition that said increasing function of Tp(Ti) is greater than THIGH, or (iv) a condition that said increasing function of Tp(Ti) is greater than or equal to THIGH;
(5) if the condition 3 holds true, then:
(5A) decreasing Tp(Ti); and
(5B) decreasing the skip count.

22. The power converter of claim 21 wherein the operations (4), (5) are performed repeatedly at least until a condition 4 holds true, wherein the condition (4) is either a condition that Tp(Ti) is between TLOW and THIGH, or a condition that said increasing function of Tp(Ti) is between TLOW and THIGH.

23. The power converter of claim 21 wherein in the operation (5A), Tp(Ti) is divided by about square root of 2, and in the operation (5B) the skip count is divided by 2 or shifted right by one bit.

24. The power converter of claim 16 wherein determining Tp further comprises limiting the skip count to a predetermined maximum value.

25. The power converter of claim 16 wherein the operation (3) further comprises:
before increasing the skip count, determining if the increased skip count would exceed a predetermined maximum value;
if the increased skip count would exceed the predetermined maximum value, then omitting the steps (3A), (3B).

26. A power converter comprising circuitry for performing the method of claim 11.

27. The power converter of claim 26 wherein the operations (2), (3) are performed repeatedly at least until a condition 2 holds true, wherein the condition 2 is either (i)

a condition that Tp(Ti) is less than THIGH, or (ii) a condition that Tp(Ti) is less than or equal to THIGH, or (iii) a condition that said increasing function of Tp(Ti) is less than THIGH, or (iv) a condition that said increasing function of Tp(Ti) is less than or equal to THIGH.

28. The power converter of claim 26 wherein in the operation (3A), Tp(Ti) is divided by about square root of 2, and in the operation (3B) the skip count is either divided by about 2 or shifted right by one bit.

29. The power converter of claim 26 further comprising, at least in each cycle Tj in which Tp(Tj)>0, at least when the input power source is not coupled to provide said current flow, coupling the converter for a time duration Ts=Ts(Tj) to reduce said current flow;
wherein said increasing function of Tp(Ti) is equal to Tp(Ti)+Ts(Ti);

wherein the condition 1 is either said condition that that said increasing function of Tp(Ti) is above THIGH, or said condition that said increasing function of Tp(Ti) is greater than or equal to THIGH.

30. The power converter of claim 29 wherein the converter is not coupled to reduce said current except in said time durations Ts; and
the operation (3) further comprises decreasing Ts(Ti).

31. A computer readable storage medium comprising one or more computer instructions for determining Tp according to the method of claim 1.

32. The computer readable storage medium of claim 31 wherein the operations (2), (3) are performed repeatedly at least until a condition 2 holds true, where the condition 2 is either (i) a condition that Tp(Ti) is greater than TLOW, or (ii) a condition that Tp(Ti) is greater than or equal to TLOW, or (iii) a condition that said increasing function of Tp(Ti) is greater than TLOW, or (iv) a condition that said increasing function of Tp(Ti) is greater than or equal to TLOW.

33. The computer readable storage medium of claim 31 wherein in the operation (3A), Tp(Ti) is multiplied by about square root of 2, and in the operation (3B) the skip count is multiplied by 2.

34. The computer readable storage medium of claim 31 further comprising, at least in each cycle Tj in which Tp(Tj)>0, at least when the input power source is not coupled to provide said current flow, coupling the converter for a time duration Ts=Ts(Tj) to reduce said current flow;
wherein said increasing function of Tp(Ti) is equal to Tp(Ti)+Ts(Ti);

wherein the condition 1 is either said condition that said increasing function of Tp(Ti) is below TLOW, or said condition that said increasing function of Tp(Ti) is less than or equal to TLOW.

35. The computer readable storage medium of claim 34 wherein the converter is not coupled to reduce said current flow except in said time durations Ts; and
the operation (3) further comprises increasing Ts(Ti).

36. The computer readable storage medium of claim 31 wherein determining Tp further comprises:
(4) determining whether or not a condition 3 holds true, wherein the condition 3 is either (i) a condition that Tp(Ti) is greater than a predetermined value THIGH, or (ii) a condition that Tp(Ti) is greater than or equal to THIGH, or (iii) a condition that said increasing function of Tp(Ti) is greater than THIGH, or (iv) a condition that said increasing function of Tp(Ti) is greater than or equal to THIGH;

(5) if the condition 3 holds true, then:
(5A) decreasing Tp(Ti); and
(5B) decreasing the skip count.

37. The computer readable storage medium of claim 36 wherein the operations (4), (5) are performed repeatedly at least until a condition 4 holds true, wherein the condition (4) is either a condition that Tp(Ti) is between TLOW and THIGH, or a condition that said increasing function of Tp(Ti) is between TLOW and THIGH.

38. The computer readable storage medium of claim 36 wherein in the operation (5A), Tp(Ti) is divided by about square root of 2, and in the operation (5B) the skip count is divided by 2 or shifted right by one bit.

39. The computer readable storage medium of claim 31 wherein determining Tp further comprises limiting the skip count to a predetermined maximum value.

40. The computer readable storage medium of claim 31 wherein the operation (3) further comprises:
before increasing the skip count, determining if the increased skip count would exceed a predetermined maximum value;
if the increased skip count would exceed the predetermined maximum value, then omitting the steps (3A), (3B).

41. A computer readable storage medium comprising one or more computer instructions for determining Tp according to the method of claim 11.

42. The computer readable storage medium of claim 41 wherein the operations (2), (3) are performed repeatedly at least until a condition 2 holds true, wherein the condition 2 is either (i) a condition that Tp(Ti) is less than THIGH, or (ii) a condition that Tp(Ti) is less than or equal to THIGH, or (iii) a condition that said increasing function of Tp(Ti) is less than THIGH, or (iv) a condition that said increasing function of Tp(Ti) is less than or equal to THIGH.

43. The computer readable storage medium of claim 41 wherein in the operation (3A), Tp(Ti) is divided by about square root of 2, and in the operation (3B) the skip count is either divided by about 2 or shifted right by one bit.

44. The computer readable storage medium of claim 41 further comprising, at least in each cycle Tj in which Tp(Tj)>0, at least when the input power source is not coupled to provide said current flow, coupling the converter for a time duration Ts=Ts(Tj) to reduce said current flow;
wherein said increasing function of Tp(Ti) is equal to Tp(Ti)+Ts(Ti);

wherein the condition 1 is either said condition that that said increasing function of Tp(Ti) is above THIGH, or said condition that said increasing function of Tp(Ti) is greater than or equal to THIGH.

45. The computer readable storage medium of claim 44 wherein the converter is not coupled to reduce said current except in said time durations Ts; and
the operation (3) further comprises decreasing Ts(Ti).

46. A computer data signal embodied in a carrier wave and comprising one or more computer instructions for determining Tp according to the method of claim 1.

47. The computer data signal of claim 46 wherein the operations (2), (3) are performed repeatedly at least until a condition 2 holds true, where the condition 2 is either (i) a condition that Tp(Ti) is greater than TLOW, or (ii) a condition that Tp(Ti) is greater than or equal to TLOW, or (iii) a condition that said increasing function of Tp(Ti) is greater than TLOW, or (iv) a condition that said increasing function of Tp(Ti) is greater than or equal to TLOW.

48. The computer data signal of claim 46 wherein in the operation (3A), Tp(Ti) is multiplied by about square root of 2, and in the operation (3B) the skip count is multiplied by 2.

49. The computer data signal of claim 46 further comprising, at least in each cycle Tj in which Tp(Tj)>0, at least when the input power source is not coupled to provide said current flow, coupling the converter for a time duration Ts=Ts(Tj) to reduce said current flow;

wherein said increasing function of Tp(Ti) is equal to

Tp(Ti)+Ts(Ti);

wherein the condition 1 is either said condition that said increasing function of Tp(Ti) is below TLOW, or said condition that said increasing function of Tp(Ti) is less than or equal to TLOW.

50. The computer data signal of claim 49 wherein the converter is not coupled to reduce said current flow except in said time durations Ts; and the operation (3) further comprises increasing Ts(Ti).

51. The computer data signal of claim 46 wherein determining Tp further comprises:

(4) determining whether or not a condition 3 holds true, wherein the condition 3 is either (i) a condition that Tp(Ti) is greater than a predetermined value THIGH, or (ii) a condition that Tp(Ti) is greater than or equal to THIGH, or (iii) a condition that said increasing function of Tp(Ti) is greater than THIGH, or (iv) a condition that said increasing function of Tp(Ti) is greater than or equal to THIGH;

(5) if the condition 3 holds true, then:

(5A) decreasing Tp(Ti); and (5B) decreasing the skip count.

52. The computer data signal of claim 51 wherein the operations (4), (5) are performed repeatedly at least until a condition 4 holds true, wherein the condition (4) is either a condition that Tp(Ti) is between TLOW and THIGH, or a condition that said increasing function of Tp(Ti) is between TLOW and THIGH.

53. The computer data signal of claim 51 wherein in the operation (5A), Tp(Ti) is divided by about square root of 2, and in the operation (5B) the skip count is divided by 2 or shifted right by one bit.

54. The computer data signal of claim 46 wherein determining Tp further comprises limiting the skip count to a predetermined maximum value.

55. The computer data signal of claim 46 wherein the operation (3) further comprises:

before increasing the skip count, determining if the increased skip count would exceed a predetermined maximum value;

if the increased skip count would exceed the predetermined maximum value, then omitting the steps (3A), (3B).

56. A computer data signal embodied in a carrier wave and comprising one or more computer instructions for determining Tp according to the method of claim 11.

57. The computer data signal of claim 56 wherein the operations (2), (3) are performed repeatedly at least until a condition 2 holds true, wherein the condition 2 is either (i) a condition that Tp(Ti) is less than THIGH, or (ii) a condition that Tp(Ti) is less than or equal to THIGH, or (iii) a condition that said increasing function of Tp(Ti) is less than THIGH, or (iv) a condition that said increasing function of Tp(Ti) is less than or equal to THIGH.

58. The computer data signal of claim 56 wherein in the operation (3A), Tp(Ti) is divided by about square root of 2, and in the operation (3B) the skip count is either divided by about 2 or shifted right by one bit.

59. The computer data signal of claim 56 further comprising, at least in each cycle Tj in which Tp(Tj)>0, at least when the input power source is not coupled to provide said current flow, coupling the converter for a time duration Ts=Ts(Tj) to reduce said current flow;

wherein said increasing function of Tp(Ti) is equal to

Tp(Ti)+Ts(Ti);

wherein the condition 1 is either said condition that that said increasing function of Tp(Ti) is above THIGH, or said condition that said increasing function of Tp(Ti) is greater than or equal to THIGH.

60. The computer data signal of claim 59 wherein the converter is not coupled to reduce said current except in said time durations Ts; and the operation (3) further comprises decreasing Ts(Ti).

* * * * *